US012338106B2

(12) United States Patent
Wijning

(10) Patent No.: US 12,338,106 B2
(45) Date of Patent: Jun. 24, 2025

(54) MARINE KNUCKLE BOOM CRANE

(71) Applicant: ITREC B.V., Schiedam (NL)

(72) Inventor: Diederick Bernardus Wijning, Schiedam (NL)

(73) Assignee: ITREC B.V., Schiedam (NL)

( * ) Notice: Subject to any disclaimer, the term of this patent is extended or adjusted under 35 U.S.C. 154(b) by 324 days.

(21) Appl. No.: 17/917,696

(22) PCT Filed: Apr. 8, 2021

(86) PCT No.: PCT/EP2021/059163
§ 371 (c)(1),
(2) Date: Oct. 7, 2022

(87) PCT Pub. No.: WO2021/204938
PCT Pub. Date: Oct. 14, 2021

(65) Prior Publication Data

US 2023/0150802 A1 May 18, 2023

(30) Foreign Application Priority Data

Apr. 8, 2020 (NL) ..................................... 2025298

(51) Int. Cl.
*B66C 23/52* (2006.01)
*B66C 23/68* (2006.01)
*B66C 23/70* (2006.01)

(52) U.S. Cl.
CPC .............. *B66C 23/52* (2013.01); *B66C 23/68* (2013.01); *B66C 23/702* (2013.01); *B66C 2700/0321* (2013.01); *B66C 2700/0385* (2013.01)

(58) Field of Classification Search
CPC .... B66C 1/34; B66C 1/14; B66C 1/22; B66C 13/02; B66C 13/04; B66C 13/06;
(Continued)

(56) References Cited

U.S. PATENT DOCUMENTS 2,805,781 A * 9/1957 Senn ........................ B66C 23/52 212/274
2,952,368 A * 9/1960 Stummer ................ B63B 27/10 212/238

(Continued)

FOREIGN PATENT DOCUMENTS

DE 3717890 A * 12/1988 ............. B66C 13/06
WO WO 2018/052291 A1 3/2018

(Continued)

OTHER PUBLICATIONS

Dutch Search Report, issued in Priority Application No. 2025298, dated Dec. 2, 2020.

(Continued)

*Primary Examiner* — Anna M Momper
*Assistant Examiner* — Henrix Soto
(74) *Attorney, Agent, or Firm* — Birch, Stewart, Kolasch & Birch, LLP

(57) ABSTRACT

A marine knuckle boom crane includes a pedestal and a crane housing rotational relative to the pedestal. A knuckle boom assembly is attached to the crane housing and includes a main boom and a spreader type jib. A hoisting system includes a first departure sheave and a second departure sheave on the jib, and a third departure sheave mounted to the main boom or to the crane housing. One or more winches drive a first, second, and third cable which are each connected to an object suspension device and each pass via the first, second, and third departure sheave, respectively, to the respective winch. The first, the second, and the third cable together define an inverted pyramid which diverges upwards from the object suspension device when handling the object.

22 Claims, 22 Drawing Sheets

(58) Field of Classification Search
CPC ......... B66C 13/08; B66C 13/10; B66C 15/02; B66C 23/42; B66C 23/52; B66C 23/68; B66C 23/66; B66C 23/82; B63B 27/10
See application file for complete search history.

(56) References Cited

U.S. PATENT DOCUMENTS

| | | | | |
|---|---|---|---|---|
| 3,557,968 A * | 1/1971 | Thaeter | B66C 23/525 | 212/311 |
| 3,591,022 A | 7/1971 | Polyakov et al. | | |
| 3,685,669 A * | 8/1972 | Morrison | B66C 13/06 | 212/274 |
| 4,350,254 A * | 9/1982 | Noly | B66C 1/101 | 294/81.4 |
| 4,653,656 A * | 3/1987 | Triplett | B66C 23/14 | 212/307 |
| 2009/0232625 A1* | 9/2009 | Almeda, Jr. | B63B 27/10 | 414/139.6 |
| 2013/0168345 A1* | 7/2013 | Hey | B66C 23/53 | 212/232 |
| 2015/0151953 A1* | 6/2015 | Weterings | B66C 13/08 | 212/273 |
| 2015/0203337 A1* | 7/2015 | Roodenburg | B63B 27/10 | 212/309 |
| 2019/0168846 A1* | 6/2019 | McConnell | B66C 13/08 | |

FOREIGN PATENT DOCUMENTS

| | | | |
|---|---|---|---|
| WO | WO-2018131995 A1 * | 7/2018 | B63B 27/10 |
| WO | WO 2019/156556 A1 | 8/2019 | |

OTHER PUBLICATIONS

International Search Report, issued in PCT/EP2021/059163, dated Jul. 2, 2021.

Written Opinion of the International Searching Authority, issued in PCT/EP2021/059163, dated Jul. 2, 2021.

* cited by examiner

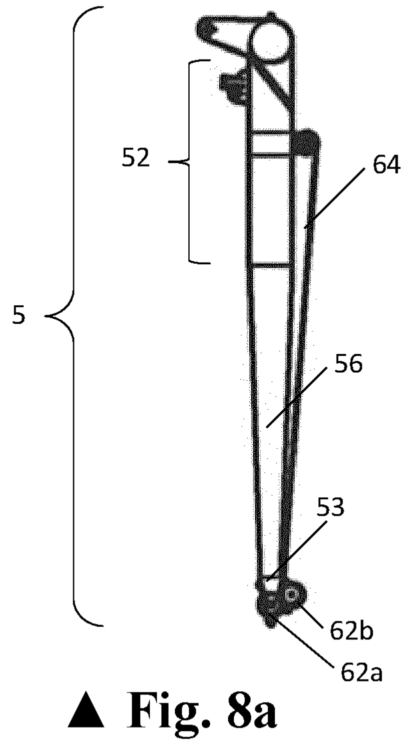
▲ Fig. 8a
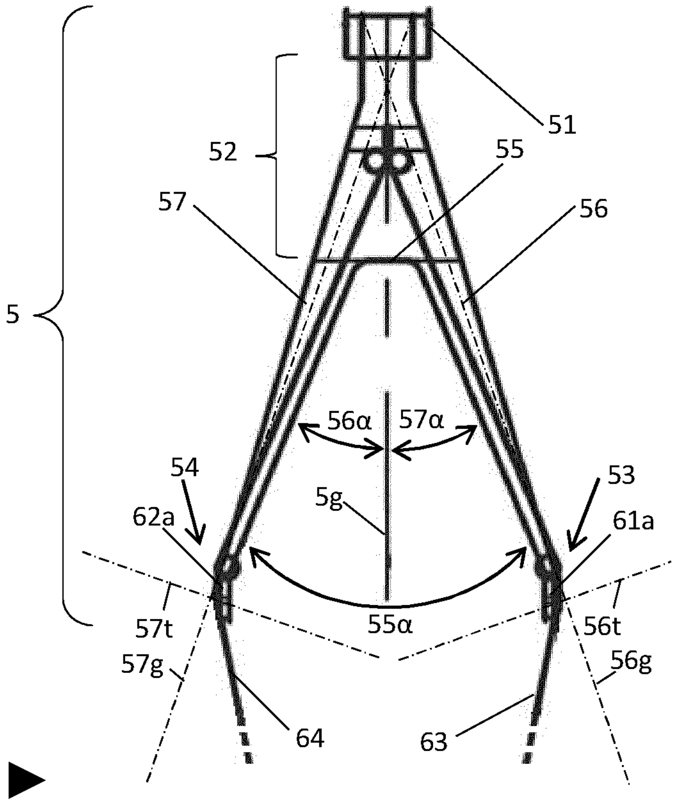
Fig. 8b ▶

MARINE KNUCKLE BOOM CRANE

FIELD OF THE INVENTION

The present invention relates to the field of marine knuckle boom cranes.

BACKGROUND OF THE INVENTION

In commonly known embodiments of a marine knuckle boom crane, the main boom of knuckle boom assembly is pivotally attached to the crane housing for up and down luffing motion of the main boom. The crane housing is rotational relative to the pedestal about a vertical rotation axis, also known as slewing motion. Often the pedestal is stationary mounted, e.g. secured to the hull of a vessel or to another offshore structure, e.g. an oil/gas production platform, etc. The knuckle boom assembly is commonly composed of a main boom and a jib, sometimes referred to a knuckle. The main boom is commonly a rigid boom with an inner end and an outer end. A longitudinal axis thereof extends through the inner end and the outer end. The jib has an inner end and has a jib tip forming a free end of the jib opposite the inner end of the jib. The inner end of the jib is connected pivotally about a horizontal pivot axis to the outer end of the main boom. The jib is pivotal between a folded position in which the jib is folded back or inwards and extended positions of the knuckle boom assembly. In known embodiments, the luffing of the main boom is driven by controlled extension and contraction of one or more hydraulic cylinders between the main boom and the crane housing. The pivoting of the jib is driven by controlled extension and contraction of one or more hydraulic cylinders arranged between the jib and the main boom. It is also known to embody the luffing of the main boom and/or the pivoting of the jib with one or more cables driven by one or more associated winches.

In the commonly known embodiments, the hoisting system of the marine knuckle boom crane comprises a departure sheave mounted to the jib tip. The system further comprises a hoisting winch, and a cable extending from the winch along the main boom and along the jib, so as to pass over the departure sheave to an object suspension device that is configured to be connected to an object that is to be handled by the crane. For example, the object suspension device has a hook.

The boom assembly articulates at the 'knuckle', allowing the jib to fold back like a finger towards an inward position of the jib. In common embodiments, the jib extends along the bottom side of the main boom in the folded position. In another embodiment, the jib folds into an elongated space within the main boom. This folding provides for a main advantage of a marine knuckle boom crane, namely a compact size of the crane when not in use. The main boom can in many embodiments be pivoted such that the folded knuckle boom assembly extends horizontally, which is very compact when the crane is not in use. For example, for larger cranes, a boom rest is provided on which knuckle boom assembly is rested when not in use. When the crane is on a vessel, the folded storage position provides, for example, for a low centre of gravity of the crane.

When handling an object using a marine knuckle boom crane, e.g. in the transfer of an object between a supply vessel and a drilling vessel or an offshore platform, e.g. with the crane mounted on the drilling rig or platform, wave-induced motions of the supply vessel and/or of the drilling vessel, and/or wind may hinder a controlled handling of the object. For example, handling of ISO containers, or of crates wherein drilling tubulars are stored may be troublesome using existing knuckle boom cranes.

OBJECT OF THE INVENTION

It is an object of the present invention to provide for improved stability and controllability of an object hoisted by a knuckle boom crane.

SUMMARY OF THE INVENTION

This object is achieved according to the invention by means of the marine knuckle boom crane according to claim 1.

The invention is based on the insight that the provision of a spreader structure jib and associated three-point hoisting system in this type of crane leads to the advantage of increased stability and controllability of the object suspended therefrom. When handling an object or positioning the object suspension device ahead of connecting the object to be handled, the first, second, and third cables define an inverted pyramid which reduces, e.g. substantially avoids, swinging and allow for accurate spatial positioning. Herein the third departure sheave is provided on the main boom and/or on the crane housing so as to follow the motion of the knuckle boom assembly about the vertical rotation axis when the crane is slewed. The third departure sheave and third cable enable the suspension in the inverted pyramidal configuration.

Preferably, the third departure sheave is located closer to the inner end of the main boom than to the outer end of the boom, or is located on the crane housing. This allows for stability enhancing relatively wide angles between the three cables in the invented pyramidal configuration, e.g. even when the main boom is oriented relatively steep upward and the jib relatively steep downward, e.g. when hoisting and/or lowering is performed along a vertical line that is in rather close range to the pedestal. If the third departure sheave would be, for example, mounted at the outer end of the main boom, or be located on the spreader structure of the jib, the same operation would be done with much sharper angles between the three cables and thereby less stabilizing effect. This effect is, for example, noticeable when the crane is mounted on a drilling vessel or offshore platform and the object to be handled is to be picked-up or placed down on deck of a supply vessel, which is practice is often much lower than the location of the crane. Then the stabilizing effect is in particular advantageous as the object suspension device is in the lower region of its operational hoisting range, and often in relatively close range to the pedestal.

In an embodiment, the position of the third departure sheave is closer to the inner end of the main boom than the position of any of the first and second departure sheaves when the knuckle boom assembly is in the folded position thereof.

In an embodiment, the boom luffing mechanism comprises one or more hydraulic cylinders arranged between the main boom and the crane housing. For example, a pair of boom luffing cylinders is provided. For example, the third departure sheave is located between the pair of boom luffing cylinders, so closer to the inner end of the boom than the points where the boom luffing cylinders engage on the main boom.

In an embodiment, the first, second, and third cable each extend from a distinct respective winch, so a first, a second, and a third winch from which respectively the first, second and third cable extends. In another embodiment, there are two winches, the first and second cable extending from a first winch that is in common for both cables, and the third cable extending from a second winch. In another embodiment, there is just one winch for the three cables.

In an embodiment, each winch comprises a drum onto which the cable is wound, the drum being driven by a motor, e.g. an electric motor, e.g. an AHC winch. In an embodiment, one motor drives multiple drums, e.g. the drums being side-by-side.

The one or more winches of the hoisting system may be placed on or accommodated in the crane housing, or alternatively be placed elsewhere, e.g. in the pedestal or below deck. In an embodiment, the crane housing has a roof and the one or more winches are mounted on or above the roof.

The one or more winches of the hoisting system may also be placed on the main boom or on the jib, e.g. on the jib base or on a jib branch. Arrangements wherein the one or more winches are placed on the main boom or on the jib may, for example, be envisaged in a crane for hoisting relatively a small load.

Preferably, the third departure sheave is located in or close to a central vertical plane of the main boom, e.g. at the bottom side of the main boom.

In an embodiment, the spreader structure of the jib is rigid. This may lead to the rigid spreader structure jib type crane taking up more space in the folded and parked position than commonly known knuckle boom cranes. However, this sacrifice of compactness is offset by the advantage of increased stability and controllability of the object suspended therefrom during use of the crane by the inverted pyramidal configuration of the cables. The rigid jib provides for a simple and robust embodiment of the crane according to the present invention.

In an embodiment, the jib is a rigid forked jib. Herein the spreader structure has a jib base connected to the pivot structure forming a horizontal pivot axis and thereby to the main boom, and comprises first and second jib branches diverging laterally outward from the jib base with a fixed angle between the diverging first and second jib branches. In an embodiment, the branches are each only connected at one end thereof to the jib base, so lacking further bracing between them. This is seen as lightweight and structurally effective. In another embodiment, one or more rigid brace members are fixed between the jib branches. In embodiments of the rigid forked jib the jib branches have a first jib tip and a second jib tip, respectively, e.g. the first departure sheave being mounted on the first jib branch proximate to the first jib tip and the second departure sheave being mounted on the second jib branch proximate to the second jib tip. These jib tips can be free ends, the branches only being connected further at their inner ends to the jib base. In another embodiments, a brace member is arranged between the ends of the jib branches to form a triangular rigid spreader structure.

In another embodiment, the jib has a rigid T-shaped spreader structure, wherein the central member of the spreader structure is pivotally mounted to the main boom and extends along the longitudinal axis of the jib, and wherein the first and second departures are mounted on the cross member of the T-shaped spreader structure.

In an embodiment, the spreader structure of the jib is collapsible between a collapsed configuration and a spread configuration, wherein the lateral extension of the spreader structure is smaller in the collapsed configuration than in the spread configuration. For example, the spreader structure comprises one or more actuators to move the spreader structure between the collapsed configuration and the spread configuration. Preferably, the spreader structure jib is folded back relative to the main boom in collapsed configuration for storage or parking of the crane when not in use.

For example, the collapsible spreader structure is movable into multiple spread configurations to allow for setting of different lateral spacing distances between the first and second departure sheaves. As will be explained herein, in embodiments, variation of this distance is done whilst performing a hoisting or a lowering of the object suspension device, e.g. whilst handling an object.

For example, in the collapsed configuration the lateral extension of the spreader structure is the same or less than the lateral extension, or width, of the main boom. E.g. when folded underneath the main boom, the collapsed spreader structure does not require more space for the crane in lateral direction that would be required for the main boom.

For example, the main boom is provided with an elongated space therein for receiving therein the jib in folded position, wherein the collapsed spreader structure of the jib is in collapsed configuration dimensioned to fit into this elongated space.

For example, in the collapsed configuration the spreader structure is in a slender, elongated shape.

In an embodiment, the jib is a collapsible forked jib, wherein the spreader structure comprises first and second jib branches that are each pivotally mounted, such that the first and second jib branches are pivotal between a spread configuration of the forked jib wherein the jib branches are diverging laterally outward and a collapsed configuration wherein the jib branches are closer to the central longitudinal axis.

For instance, in the collapsed configuration the jib branches extend substantially parallel to the central longitudinal axis of the jib.

The collapsible embodiment of the forked jib provides the advantage over the rigid forked jib, that a sacrifice of reduced compactness for the benefit of increased stability and control of the position of the object is reduced or avoided. Thus, the collapsible embodiment may provide the compactness of known knuckle boom cranes, while providing additionally for stable and controlled hoisting by the advantageous pyramidal suspension of the object.

For example, in the collapsible forked jib, the first departure sheave is mounted on the first jib branch proximate to a first jib tip thereof and the second departure sheave is mounted on the second jib branch proximate to a second jib tip thereof.

In another embodiment, the collapsible jib has a collapsible T-shaped spreader structure, wherein the central member of the spreader structure is pivotally mounted to the main boom, about a horizontal axis, and extends along the longitudinal axis of the jib. Herein the first and second departure sheaves are mounted on the cross member of the T-shaped spreader structure, e.g. at opposed ends thereof. Herein, the cross member is embodied so as to be collapsible in order to reduce the lateral extension of the jib when desired, e.g. for storage of the boom assembly. For example, the entire cross-member is swivelling relative to the central member about a swivel axis, e.g. at the outer end of the central member, between an operative position transverse to the central member and a collapsed position aligned with the central member. In another example, the cross-member is embodied as two swivelling cross-member elements, each swivelling relative to the central member about a swivel axis between an operative position transverse to the central member and a collapsed position aligned with the central member, e.g. along a lateral side of the central member.

In an embodiment, the collapsible forked jib comprises a jib base that is connected pivotally about a second horizontal pivot axis to the main boom, e.g. at the outer end of the main boom, wherein the first and second jib branches that are each pivotally mounted, e.g. each via a respective pivot axis, to the jib base for pivoting between the spread and collapsed configurations. The jib branch pivot axes may be laterally offset from one another, e.g. mounted at opposed lateral sides of a central main body of the jib base. In another embodiment, the branch pivot axis coincide with one another. In yet another embodiment, the first branch is pivoted to the jib base, and the second jib branch is pivoted to the first jib branch.

In an embodiment, the jib branches make up the major part of the forked jib length (seen in direction of the central axis thereof), so that the forked jib essentially has the shape of a V. In another embodiment, the forked jib base extends over a larger part of the length of the entire jib, so that the forked jib has the shape of a Y.

In an embodiment of the collapsible forked jib, the first and second jib branches are each at a base end thereof connected via a respective pivot structure to the main boom, so as to be both movable between the folded position and extended positions of the knuckle boom assembly, as well as between the spread configuration and the collapsed configuration of the collapsible forked jib. For example, herein the jib pivoting mechanism is configured to pivot each jib branch independently between the folded and extended positions. This embodiment, may, for example, allow for use of the crane with one branch being extended, yet not spread, and the other branch remaining in folded position, e.g. when handling a relatively lightweight object using a single cable. For example, each jib pivoting structure comprises two mutually perpendicular pivot axis, e.g. including one horizontal pivot axis for folding and extending motion of the jib branch relative to the main boom, and one further pivot axis, e.g. vertical pivot axis. For example, in an embodiment, the vertical pivot axis is closest to the main boom.

In an embodiment, the angle between the diverging first jib branch and second jib branch is between 20° and 80°, e.g. between 20° and 60°, e.g. around 40°. For instance, the first and second jib branch depart from a physical or imaginary bifurcation at a respective jib branch angle with respect to the central longitudinal axis of the jib of between 10° and 40°, e.g. between 10° and 30°, e.g. around 20°.

In an embodiment, the first and second jib branches are each pivotal with respect to the central longitudinal axis of the forked jib about a respective jib branch pivot axis, allowing to bring the collapsible forked jib into one or more spread configurations and into the collapsed configuration.

For instance, the jib branches are pivotal between multiple spread positions wherein the angle of divergence between them is larger than 30°, e.g. about 40°, and into the collapsed configuration, e.g. wherein said angle is zero, to the benefit of the compactness of the crane, e.g. when parked in a folded position of the knuckle boom assembly.

In an embodiment of the spreader type jib, the lateral distance between the first departure sheave and the second departure sheave is fixed or variable between 10 and 15 meters, e.g. about 12 meters, e.g. in one or more spread configurations of the collapsible spreader structure jib.

For example, a minimum lateral spacing between the first and second departure sheaves of 10 meter in spread configuration (whether of rigid or collapsible design) is advantageous, e.g. in view of the described transfer of objects between a supply vessel and another vessel e.g. drilling vessel, offshore platform.

In an embodiment, seen in side view, the distance or length of the jib between the pivot structure and the first/second departure sheaves is at least 10 meters, e.g. between 15 and 25 meters, e.g. about 20 meters.

In an embodiment, seen in side view, the length of each of the jib branches of the forked jib is between 15 and 25 meters, e.g. about 20 meters.

In an embodiment, the jib is telescopically extensible so as to vary the distance, seen in side view, between the pivot structure to the main boom on the one hand and the location of the first and second departure sheaves on the other hand.

In an embodiment, the jib branches of the forked jib are embodied as telescopically extensible jib branches. For example, the lateral spacing between the first and second departure sheaves is adjustable by extension and retraction of the telescopic jib branches.

In an embodiment of the forked jib, the jib base is telescopic, e.g. allowing to change the distance between the second horizontal pivot axis and the pivot axis of the jib branches in a collapsible forked jib.

In an embodiment, the jib branches are embodied as telescopic jib branches, wherein a control unit is provided to control the telescoping of the jib branches during hoisting and/or lowering of an object. This, for example, allows for enhanced control of the angles of the three cables during such activity, e.g. in view of the desired stabilizing effect associated with an increased angle of the cables relative to a vertical through the object suspension device.

In an embodiment of the forked jib, the jib branches each are rigid and fixed length jib branches. This allows for a simple and robust construction.

In embodiments, hoisting is foreseen with the collapsible spreader type jib, e.g. collapsible forked jib, in the collapsed configuration thereof, e.g. using an object suspension device that is suspended from only one of the first and second cable, or from both the first and second cables, e.g. without involving the use of the third cable.

In an embodiment of the collapsible forked jib, the first and second branch are provided with cooperating fixation members, mechanically fixating the branches to one another when in the collapsed configuration, e.g. so as to increase the load bearing capacity, e.g. in view of hoisting with the forked jib in the collapsed configuration thereof. For example, the branches are to be fixated at one or more locations along there length so as to act as one integral beam when subjected to load using one or both of the first and second cable in the collapsed configuration. For example, a fixation member comprises a motor operated, e.g. hydraulically, operated mobile fixating member, e.g. a hook or pin, urging the branches into (bending) load sharing contact.

In embodiment, hoisting with the crane is foreseen with the object suspension device suspended from just two of the three cables, e.g. from the third cable and one of the first and second cables, or from the first and from the second cable but not from the third cable. It will be appreciated that the provision of two or more, e.g. three, distinct winches for the three cables facilitates such alternative operations of the crane. For example, such "two-cables" hoisting operations are performed with the collapsible forked jib in collapsed configuration.

For example, in the collapsed configuration of the forked jib, the angle between the first and second jib branches is about or close to 0°.

For instance, in the collapsed configuration of the forked jib, the jib branches extend parallel to the central longitudinal axis of the jib.

In the spread configurations of the forked jib, the angle between the first jib branch and the second jib branch is preferably at least 20°, e.g. between 20° and 60°, e.g. about 40°.

For instance, in a spread configuration of the forked jib, the first and second jib branches depart from a bifurcation at a respective jib branch angle with respect to the central longitudinal axis of the jib of between 10° and 40°, e.g. between 10° and 30°, e.g. about 20°, e.g. the jib branch angles being equal.

In an embodiment, the first and second departure sheaves are between 1-3 meters apart in the collapsed configuration of the jib, e.g. about 2 meters apart.

In an embodiment, the collapsible forked jib further comprises a transverse bar, which is configured to releasably interconnect the first and second jib branches in a spread configuration, such as to secure the first and second jib branches relative to one another at an angle between them. For instance, the transverse bar is mounted to either the first or the second jib branch and is releasably connectable to the other of the jib branches, e.g. pivotally mounted to one of the jib branches and swingable into a position extend to the other jib branch.

In an embodiment, the spreader structure is movable into multiple spread configurations to allow for setting of different lateral spacing distances between the first and second departure sheaves, the spreader structure comprising one or more actuators to move the spreader structure between the collapsed configuration and the spread configuration.

In an embodiment, one or more actuators are configured to vary the lateral spacing between the first and second departure sheaves during a hoisting and/or lowering of the object suspension device, e.g. with an object suspended from the object suspension device.

In an embodiment, a control unit is provided for the one or more actuators that control the lateral spacing between the first and second departure sheave, which control unit is configured, e.g. programmed, such as to operate the one or more actuators such as to decrease the distance between the first and second departure sheaves during a hoisting and to increase the distance between the first and second departure sheaves during a lowering e.g. said decrease and increase being related to vertical motion and/or a vertical height of the object suspension device.

In an embodiment of the collapsible forked jib, addition to providing compactness of the crane, e.g. for parking the crane, the provision of pivotal jib branches, preferably in combination with one or more jib branch actuators, may enable to manipulate or set the angle of the cables suspending the object suspension device and the object connected thereto by pivoting the jib branches between different spread configurations of the branches in which the diverging angle between them is different. In an embodiment, this change of the diverging angle between the jib branches is effected during a hoisting and/or a lowering of an object, so as part of a hoisting routine, e.g. automatically performed by a control unit of the crane. For instance, a larger angle between the jib branches provides for more stability, but decreases a height range over which the object can be hoisted.

The provision of pivotal jib branches in the collapsible forked jib, preferably in combination with one or more jib branch actuators, may enable to increase the stability of the object during hoisting as well as increase of a maximum hoist height, so that these may be optimized depending on the individual hoisting job for which the crane is used.

For instance, the angle between the branches may be decreased to increase the maximum hoisting height of the object, e.g. the branches being pivoted from a maximally spread configuration when the object is at the lowest point of the hoisting range towards a collapsed configuration when the object moves to a highest point of the hoisting range. Thereby increased stability may be achieved in a lower range of the hoist height, e.g. in pick-up of the object from a supply vessel or when positioning the load on a supply vessel, in which lower range pendulous action of the object would have the largest magnitude, and the maximum hoist height may be the same as would be reached if the jib would not be branched.

In embodiments, the jib branches are pivotal into different angular positions relative to the central longitudinal axis of the jib, for example each having its own jib branch actuator to perform the pivoting. This may, for example, provide for the possibility to adjust the lateral position the object suspension device relative to the boom assembly.

To effect a pivoting of the jib branches in the collapsible forked jib, e.g. for manipulating the vertical angles of the cables and/or for the lateral positioning, the crane preferably comprises one or more jib branch actuators. For example, each jib branch actuators is embodied as a linear actuator, e.g. as a hydraulic cylinder. In another example, a jib branch actuator comprises a motor, e.g. electric or hydraulic, having a rotary output that is connected, e.g. via a transmission, e.g. a gear transmission, to the jib branch to effect the pivoting thereof. Other designs are also possible.

In an embodiment, the one or more jib branch actuators are linked to a control unit that is configured to drive the pivoting, for example such as to decrease the angle between the first and second jib branches during hoisting of the object suspension device, and to increase the lateral angle there between during a lowering of the object suspension device. For example, said control unit controls said variation of the angle of divergence between the jib branches based on a pre-programmed routine and/or based on a measurement of the actual hoisting height, etc.

For instance, the jib branch angles of both jib branches relative to the central longitudinal axis remain equal to each other when pivoting the jib branches in the collapsible forked jib.

In an embodiment, the control of the one or more jib branch actuators is based on measurements relating to the actual height position of the object suspension device or the object itself, and/or the angles of the cables.

In an embodiment, the crane comprises one or more jib branch actuators which are configured to allow for a pivoting of both the first and the second jib branches in the direction of one lateral side of the central longitudinal axis of the jib, such as to laterally displace the object suspension device, e.g. with the object connected thereto, with respect to the central longitudinal axis of the jib.

For example, the one or more jib branch actuators comprise one or more cylinders, driving the jib branches each individually or together, independently or dependently.

For example, a cylinder is connected to both of the jib branches, such that extension of the cylinder drives a pivoting movement of the jib branches away from each other, e.g. into an(other) spread configuration thereof, and shortening thereof drives a pivoting movement of the jib branches towards each other, e.g. into an(other) spread configuration thereof or a collapsed configuration thereof.

In an embodiment, the collapsible forked jib further comprises a first and second transverse bar. The first and second bars are pivotally connected to one or more jib branch actuators with one longitudinal end thereof, and with another longitudinal end thereof to the first and second branch, respectively, such that movement of the other longitudinal end of the first and second transverse bar along or parallel to the central longitudinal jib axis changes the angle of the first and second transverse bar relative to the longitudinal axes of the first and second jib branches, respectively, therewith pivoting the jib branches around the first and second vertical pivot axes of the jib branches, respectively, thereby moving the jib to another spread configuration of the jib branches, or into a collapsed configuration of the jib branches, if provided.

Preferably, the one longitudinal ends of the transverse bars are both connected to one and the same jib branch actuator which moves them together along the central longitudinal jib axis, thereby pivoting the jib branches together around the respective vertical pivot axes thereof. For instance, in the collapsed configuration of the jib branches the transverse bars are substantially longitudinally aligned with the first or second jib branch, respectively.

In an embodiment, the one or more jib branch actuators are cylinders, e.g. one cylinder, mounted on the jib base along or parallel to the central longitudinal jib axis, e.g. between the jib branches, the longitudinal ends of the bars moving by extension and shortening of the cylinders.

In an embodiment, the first and second transverse bars and the one or more jib branch actuators together form a locking mechanism that secures the angle of the first and second transverse bar relative to the first and second jib branch, respectively, thereby securing the jib branch angles. For instance, the first and second transverse bar are pivotal into a locking position in which these extend at a right angle with the first and second jib branch, respectively.

In an embodiment, the one or more hoist winches, e.g. three distinct winches, are mounted on the crane housing, wherein a cable guide sheave for the first cable and a cable guide sheave for the second cable are mounted at the outer end of the main boom, e.g. about an axis coinciding with the second horizontal pivot axis. Further a guide sheave for the first cable and a guide sheave for the second cable are mounted to the jib, e.g. the jib base of a forked jib. In the collapsible forked jib, it is preferred that each of these guide sheaves is mounted about an axis coinciding with the respective jib branch pivot axis.

In an embodiment, the one or more winches are mounted on the crane housing, e.g. mounted on or above a roof of the crane housing.

In an embodiment, the first and second cables extend, seen in top view, above the topside of the main boom to a respective cable guide sheave for the first cable and a respective cable guide sheave for the second cable, said cable guide sheaves being mounted on the main boom in proximity to the pivot structure that pivotally connects the jib to the main boom, e.g. at the outer end of the main boom, e.g. about an axis coinciding with a second horizontal pivot axis.

In an embodiment, the spreader structure is provided with a guide sheave for the first cable and a guide sheave for the second cable that are mounted at the base end thereof, e.g. to a jib branch or to the jib base of a collapsible forked jib. For example, in an embodiment of a collapsible forked jib, these guide sheaves are each rotatable about an axis coinciding with the respective jib branch pivot axis, e.g. arranged at the underside of the jib branch.

In an embodiment, the jib base has a main body that is provided with laterally spaced bracket arms, e.g. perpendicular to the extension of the main body, that each connect via a pivot to the main boom at the outer end thereof. For example, the jib branches are each pivotally connected to the main body of the jib base. In an embodiment, the first and second cable pass each from a cable guide sheave on the main boom between the bracket arms to a guide sheave arranged on an underside of the jib base, and from said guide sheave to the respective departure sheave long said underside of the respective jib branch.

In an embodiment, the lateral spacing between the bracket arms corresponds to the lateral spacing between the pivot axes of the jib branches, thus providing for an effective load path through the jib base.

In an embodiment, a main body of the jib base is an elongated main body extending along the longitudinal axis of the collapsible forked jib, wherein the jib branches are mounted pivotally to the main body at opposed lateral sides of the main body, so that in the collapsed configuration the elongated main body is located between the jib branches. For example, each jib branch is then supported against the main body of the jib base.

In an embodiment, a main body of the jib base is an elongated main body extending along the longitudinal axis of the collapsible forked jib, wherein a cylinder operating the first and second transverse bar as discussed above is mounted in or on the elongated main body.

In an embodiment, the jib pivoting mechanism comprises one or more hydraulic cylinders arranged between the main boom and the jib. For example, a single hydraulic cylinder.

In an embodiment, a hydraulic cylinder for pivoting the jib is provided, having the cylinder body pivotally connected to the main boom, and the piston rod to the jib. For example, the cylinder body is connected to the underside of the main boom at the gland side of the cylinder body, so where the piston rod extends from the cylinder body. In an embodiment, the main boom is provided with a slot in proximity of this cylinder allowing for the cylinder body to move into the slot, e.g. when folding the jib to the most folded position.

In an embodiment, the crane housing is provided with an operators cabin for accommodating the crane operator.

In an embodiment, the pedestal is provided with an access platform extending about the pedestal and the crane housing is provided with a ladder allowing the crane operator to gain access to the operators cabin via the access platform and then the ladder. For example, the pedestal is provided with a staircase to gain access to the access platform.

For the purpose of facilitating the functionality of the first and second departure sheaves, e.g. reducing friction of the cables running there over, the circumferential surface of the first and second departure sheave over which the cables run, preferably, remains in line with the first and second cable during hoisting and lowering of the object suspension device, despite the occurring change in the vertical departure angles of these cables. Changes in the vertical departure angles of the cables may also be encountered as a consequence of moving the departure sheaves along the jib branches for horizontally moving the object in case this is provided for, or as a consequence of moving the jib branches relative to the jib base, as will be discussed below. Most preferably, this alignment of the departure sheaves is possible over the entire hoisting range of the crane and/or the entire range of movability of the departure sheaves or jib branches, if provided.

In an embodiment, the first and the second departure sheave are pivotally mounted to the jib, e.g. to the first and second jib branch, e.g. at the tip of the respective jib branch, such as to allow alignment with the first and second cable while respective vertical angles thereof change, e.g. during hoisting and lowering of the object suspension device.

The first and second departure sheave may be pivotal around a longitudinal axis of the first and second jib branch, respectively.

In an embodiment, the first and second departure sheave are at least pivotal around an axis through or parallel to the cable part extending along the first and second jib branch to the sheave, respectively. Thereto the departure sheaves may for instance be mounted to the respective jib branches via pivot joints providing a rotational degree of freedom.

For example, the third departure sheave is located in, or in proximity of, a vertical centre plane of the boom assembly.

In an embodiment, the third departure sheave is attached to the main boom, or the crane housing, via a protruding element, e.g. an arm extending from the main boom or the crane housing, to which the third departure sheave is attached. For example, the protruding element is pivotal around a horizontal axis between a retracted position, e.g. close to the bottom side of the boom, and one or more deployed positions away from the boom, e.g. an actuator driving said pivoting. The protruding element may also be displaceable by another arrangement with respect to the main boom. The protruding element may be embodied as an articulated and/or telescoping arm.

In an embodiment, the third departure sheave is attached to the main boom such as to be displaceable along the longitudinal axis of the main boom, e.g. along a rail or a guide cable, e.g. by means of one or more actuators.

In an embodiment, the first and second departure sheaves are each mounted to the respective jib branch such as to be displaceable along the longitudinal axis of the respective jib branch, e.g. along a rail or a guide cable.

By displacing or adjusting the position of the third departure sheave and/or of the other two departure sheaves relative to the main boom and/or to the jib the position of the object suspension device and thereby of the connected object, as well as the vertical angles of the cables, may be adjusted independent of the operation of the winches.

In an embodiment, the forked jib may be configured to move the object suspension device laterally relative to the central longitudinal axis of the jib, e.g. by a lateral movability of the jib branches relative to the jib base, e.g. as will be discussed below, or of the departure sheaves relative to the jib base. In these embodiments, for facilitating the functionality of the third departure sheave, similar to the first and second departure sheave a pivotability thereof, e.g. about a vertical axis and/or a longitudinal direction of the main boom, or around multiple axes, may be provided for maintaining alignment, e.g. lateral alignment, with the third cable.

The position of the third departure sheave may be between the jib branches in a folded position of the knuckle boom assembly, e.g. longitudinally proximate the first and second departure sheaves when the boom is completely folded.

In an embodiment, the hoisting system further comprises a fourth departure sheave and a fifth departure sheave. The fourth departure sheave is mounted in the plane of the first departure sheave with the first cable running in between the first and fourth departure sheave, allowing for a folded position of the jib wherein the first cable runs over the fourth departure sheave, whereas in more forward or extended positions of the jib the first cable runs over the first departure sheave. Correspondingly, the fifth departure sheave is mounted in the plane of the second departure sheave with the second cable running in between the second and fifth departure sheave, such that in said folded position of the jib the second cable runs over the fifth departure sheave, and in forward or extended positions of the jib the second cable runs over the second departure sheave. In an embodiment, each of the fourth and fifth sheave is movable between an active position and a non-active position relative to the first and second sheave respectively, e.g. in view of arranging the cables between these grouped sheaves.

The knuckle boom crane with the third and fifth departure sheaves allows the crane to hoist an object with the jib folded into only a small angle with the main boom or parallel to the main boom while maintaining the inverted pyramidal configuration of the three cables, so that the benefits thereof are also maintained in this folded position of the jib.

Preferably, when provided, the third and fifth departure sheaves are mounted pivotally such as to remain aligned with the departing hoisting cables, just as discussed herein for the first and second departure sheaves.

In an embodiment, the one or more winches driving the first, second, and third cables are active heave compensating winches (AHC-winches), configured to compensate heave motions. The heave compensating action of the one or more winches may be controlled by a control unit operating the one or more winches, e.g. based on a signal of one or more sensors measuring the motions to be compensated. For example, the crane is mounted on a vessel that is subject to heave motion, with the pedestal being secured to the hull of the vessel. In another example, the crane is mounted to a platform or other structure (e.g. a jack-up vessel) that is stationary in the sea, so that the crane is not subject to heave. Heave compensation may then be employed in view of transfer of an object from a supply vessel to the platform, with the supply vessel being subject to heave motion.

Instead of, or combined with, the provision of one or more active heave compensating winches, the hoisting system may comprises one or more other heave compensating mechanisms acting on one or more of, preferably all of, the first, second, and third cables. For example, one or more of the first, second, and third cables are passed along sheaves of a heave compensator, e.g. a heave compensating cylinder. For example, the heave compensating cylinder is part of a passive and/or active heave compensation system.

In an embodiment, one or more, e.g. each, of the first, second, and third cables are in a multiple-fall arrangement, e.g. a double fall arrangement, between the suspension device on the one hand and the jib branch or the main boom/crane housing on the other hand. For instance, the three cables are each in a double-fall arrangement. In another embodiment, the three cables are in a triple-fall arrangement, with each cable having a dead end on the suspension device.

For example, the first and second cables are each in a double fall arrangement, with a dead end of each of said cables connected to the respective jib branch. For example, each jib branch is provided with a cable guide sheave that guides the cable from said dead end to a return sheave on the object suspension device. Preferably, this guide sheave is arranged side-by-side with a respective first or second departure sheave, e.g. each sheave of such a pair being rotatable, or swinging, about an axis parallel to the extension of the jib branch.

For example, the third cable is a in double fall arrangement with a dead end connected to the main boom or to the crane housing. As will be explained herein, another double fall configuration of the third cable is also possible.

In an embodiment, the hoisting system comprises for the first and/or second cable, if arranged in multiple falls, a respective first and/or second return sheave over which the first and/or second hoisting cable is run between the respective first and/or second departure sheave and the object suspension device. The hoisting system may further comprise for the first and/or second hoisting cable, if arranged in multiple falls, a first and/or multiple second guide sheave, e.g. proximate the first and/or second jib tip, respectively for guiding the fall of the first and/or second cable returning from the object suspension device to a dead end on the first and/or second jib branch, e.g. the tip, respectively.

In a multiple fall arrangement of the third cable, the hoisting system further comprises a third return sheave over which the third hoisting cable is run between the third departure sheave and the object suspension device, and may further comprise a third guide sheave for guiding the returning fall of the third cable to a dead end on the main boom or on the crane housing.

In an embodiment, the three hoisting cables are all in a double-fall arrangement, and the hoisting system further comprises a first, second and third return sheave, and optionally a first, second and third guide sheave for the first, second and third cable, respectively, e.g. paired with the respective first, second, and third departure sheave.

In an embodiment wherein all of the three cables are in a multi-fall, e.g. at least double-fall arrangement, the crane may further comprise an active suspension adjustment mechanism as will be described herein. This active suspension adjustment mechanism provides for a primarily horizontal controlled motion of the object suspension device and therewith of the connected object, when present. This horizontal motion is, for example, of use for adjusting the horizontal position of the object or of the suspension device that is to be connected to the object to be handled.

The provision of the active suspension adjustment mechanism allows for a division of tasks between said mechanism on the one hand and the one or more hoist winches on the other hand. The one or more winches may be primarily used for vertical motion of the object suspension device, so for the actual lifting and lowering of an object, whereas the mechanism may be primarily used for controlled horizontal motion or positioning of the object suspension device. This, for example, allows for an embodiment of the crane wherein the three cables are all driven by one and the same winch. Or wherein multiple winches are operated synchronously. The one or more winches may, in conjunction with the mechanism, also be configured and operated to provide heave motion compensation of the object suspension device, so primarily compensation motion in vertical direction, e.g. the one or more winches being embodied as AHC winches.

The mechanism may be employed for providing active motion compensation of the object or suspension device in a horizontal plane, for instance to compensate for horizontal vessel motion, e.g. for deviations in position holding of a dynamic positioning system of the vessel, e.g. of a vessel on which the crane is mounted or of a vessel from and/or onto which objects are (un)loaded by a crane that is mounted on another vessel or offshore structure. For example, the mechanism is used in transfer of objects between a supply vessel and another vessel or offshore structure, wherein the supply vessel is commonly exhibiting quite significant motion, both vertically and horizontally, relative to the other (larger) vessel or stationary structure.

The active suspension adjustment mechanism may be in a one-fold, a twofold, or a threefold actuated configuration, in which the active suspension system comprises respectively one, two, or three adjustment actuators and one, two, or three sheave pairs, each moved under control of a respective adjustment actuator. Herein, each sheave pair has a primary sheave and a secondary sheave. One of the three cables of the hoisting system is run over the primary sheave and another one of the three hoisting cables is run over the secondary sheave, in opposite direction. As a result of opposite loads by the two cables on the sheave pair, the associated adjustment actuator primarily serves for moving the sheave pair, and thus the object suspension device, without being subjected to the actual load of the object that is being handled.

The two sheaves of the pair are interconnected, e.g. mounted in a common frame, preferably the sheaves being arranged in parallel, and more preferably in the same (vertical) plane. Each sheave pair is movable as a unit along a motion axis of the sheave pair by the associated adjustment actuator, e.g. a linear drive actuator, e.g. a hydraulic cylinder, which motion axis extends parallel to the directions of the cables running over the sheaves of the pair.

In the one-fold actuated embodiment, the active suspension adjustment mechanism has one sheave pair and one associated actuator. A first one of the first, second, or third cable is reeved from the related winch, e.g. a first one of the winches, via the primary sheave of the one sheave pair, the related first, second or third departure sheave and the related first, second, or third return sheave, back to the related first jib tip, second jib tip, or main boom proximate the third departure sheave. A dead end of this cable is fixed to the crane or, if present, guided via a first, second, or third guide sheave to a different location on the crane where it is fixed to the crane. A second one of the first, second or third cable is reeved from the related winch, e.g. a second one of the winches, via a secondary sheave of the one sheave pair, the related first, second, or the third departure sheave and the related first, second, or third return sheave, back to the related first jib tip or second jib tip or main boom proximate the third departure sheave. A dead end of this cable is fixed to the crane or, if present, guided via a first, second, or third guide sheave to a different location on the crane where it is fixed to the crane. A third one of the first, second or third cable is reeved from the related winch, e.g. a third one of the winches, via the related first, second, or the third departure sheave and the related first, second, or third return sheave, back to the first jib tip or second jib tip or main boom proximate the third departure sheave. A dead end of this cable is fixed to the crane or, if present, guided via a first, second or third guide sheave to a different location on the crane where it is fixed to the crane.

The effect is that when the one adjustment actuator moves the one sheave pair, with the one or more winches at standstill, there is a variation in length of both cables running over the sheaves of the sheave pair. As a result of this movement of the sheave pair the object suspension device is moved along a trajectory that primarily extends in the horizontal plane, which trajectory is determined by the spatial locations of the departure sheaves and by the cable lengths between the suspension device and the departure sheaves. This trajectory is slightly curved as a result of the inverted pyramidal arrangement.

In the twofold actuated configuration, which is the preferred embodiment in combination with the inventive spreader type jib design, the active suspension adjustment mechanism comprises a first sheave pair and a second sheave pair, each of the sheave pairs comprising a primary sheave and a secondary sheave which are interconnected such as to enable two of the first, second, and third cables to run over a sheave of the pair, the cables extending in opposite directions. Furthermore a first adjustment actuator and a second adjustment actuator are present, each configured for moving respectively the first and second sheave pair in the direction of the pair of cables run over the sheaves.

The first cable is reeved from a respective winch, e.g. a first winch, via:

the primary sheave of the first sheave pair,
the first departure sheave,
the first return sheave, to a location on the crane, e.g. on the jib, e.g. on a first jib branch, where a dead end of the first cable is fixed.

The second cable is reeved from a respective winch, e.g. a second winch, via:

the primary sheave of the second sheave pair,
the second departure sheave,
the second return sheave, to a location on the crane, e.g. on the jib, e.g. on the second jib branch, where a dead end of the second cable is fixed.

The third cable is reeved from a respective winch, e.g. a third winch, via:

the secondary sheave of the second sheave pair,
the third departure sheave,
the third return sheave,
a third guide sheave paired with the third return sheave on the main boom or the crane housing,
the secondary sheave of the first sheave pair, to a location on the crane, e.g. on the main boom or the crane housing, where a dead end of the third cable is fixed.

Herein, the first adjustment actuator is configured to move the first sheave pair such as to selectively increase or decrease the part of the length of the first cable between the respective winch and the first departure sheave and simultaneously decrease or increase the part of the length of the third cable between the third guide sheave and the dead end of the third cable.

The second adjustment actuator is configured to move the second sheave pair such as to selectively increase or decrease the part of the length of the second cable between the respective winch and the second departure sheave and simultaneously decrease or increase the part of the length of the third cable between the winch and the third departure sheave.

In an embodiment, the first and second adjustment actuators are embodied as a first and a second linear actuator, e.g. as an adjustment cylinder, e.g. a hydraulic cylinder, each of which has one of the cylinder and piston rod fixed to the crane, e.g. to the main boom, and the other of the cylinder and the piston rod to the associated sheave pair, respectively, such that a shortening or lengthening of the first and/or second cylinder respectively moves the first and/or second sheave pair in the directions of the cables run over the sheaves thereof.

Similar to the one-fold mechanism, in the twofold mechanism the movement of either one of the sheave pairs by either of the two adjustment actuators results primarily in horizontal movement of the object suspension device along a curved trajectory in space which is determined by the spatial locations of the departure sheaves and the cable lengths to the suspension device. The motion can be purely in the horizontal plane, for example, if at the same time the cable lengths are adjusted by appropriate control of the one or more winches. The twofold mechanism provides the possibility to combine movement components along the trajectories by moving both sheave pairs of the mechanism simultaneously. For instance, moving the two sheave pairs by the same amount such as to equally combine movement components along both curved trajectories, results in a substantially straight movement trajectory mainly in the horizontal plane.

The cables in the mechanism may all be driven by one and the same winch, in an embodiment. In another embodiment, for example, two winches are present; the one for both the first and second cable and the other winch for the third cable. In an embodiment, each of the three cables is driven by a distinct winch.

In the threefold actuated embodiment, the active suspension adjustment mechanism comprises a first, a second, and a third sheave pair and three associated adjustment actuators. Herein, each adjustment actuator is configured for moving an associated sheave pair in the direction of the cables run there through in opposite directions.

The first cable is reeved from a respective winch, e.g. a first winch, via:

the primary sheave of the first sheave pair,
the first departure sheave,
the first return sheave,
a first guide sheave on the first jib branch,
the secondary sheave of the third sheave pair, back to a dead end of the cable secured to the crane, e.g. to the jib or the main boom.

The second cable is reeved from a respective winch, e.g. a second winch, via:

the primary sheave of the third sheave pair,
the second departure sheave,
the second return sheave,
a second guide sheave on the second jib branch,
the secondary sheave of the second sheave pair, back to a dead end of the cable secured to the crane, e.g. to the jib or the main boom.

The third cable is reeved from a respective winch, e.g. a third winch, via:

the primary sheave of the second sheave pair,
the third departure sheave,
the third return sheave,
the third guide sheave proximate the third departure sheave,
the secondary sheave of the first sheave pair, to a dead end of the cable secured to the crane, e.g. to the main boom.

Similar to the twofold mechanism, in the threefold mechanism the movement of a selected one of the sheave pairs results in a mainly horizontal movement of the object suspension device over a respective curved trajectory in space which is determined by the spatial locations of the departure sheaves and the cable lengths from which the object suspension device is suspended. The threefold mechanism, similar to the twofold mechanism, also provides the possibility to combine movement components by moving two sheave pairs, e.g. in synchronicity. For instance, moving two of the sheave pairs at the same time and by the same amount such as to equally combine movement components along both curved trajectories, results in a substantially straight movement trajectory, mainly in the horizontal plane.

Of the three configurations of active adjustment suspension adjustment mechanisms, the twofold version is preferred in combination with the inventive knuckle boom crane as it enables the desired horizontal motion control by the least number of (moving) parts. Namely, it allows for three-dimensional control of the movement of the object or object suspension device using the one or more winches primarily for vertical motion and the mechanism with only two adjustment actuators and two sheave pairs for primarily horizontal motion control.

For example, movements in the horizontal plane are primarily effected by the active adjustment suspension adjustment mechanism and vertical movement is primarily done by the operation of the one or more winches, e.g. whilst the rest of the crane is at standstill. The threefold actuated form has three actuators and sheave pairs, but does not add another dimension to the controlled motion of the object or object suspension device compared to the twofold actuated form. The one-fold actuated form has one actuator and sheave pair, but allows for only one movement trajectory in the horizontal plane.

Starting from the threefold actuated embodiment, two instead of three curved trajectories in the horizontal plane suffice for the desired movement of the object suspension device.

In an embodiment, the adjustment actuators of the active suspension adjustment mechanism are in the form of one or more hydraulic adjustment cylinders. For instance, the first, second and third adjustment actuator, in as far as present, are or comprise a first, second and third adjustment cylinder. The one or more adjustment cylinders are arranged preferably arranged between one of the crane housing and the main boom on the one hand, and the sheave pair on the other hand, e.g. with the longitudinal axis of the cylinder parallel to the motion range of the sheave pair so that a shortening or lengthening of the cylinder moves the sheave pair in the directions of the cables run there through. For instance, a piston rod of the adjustment cylinder is connected to the sheave pair and the cylinder body is connected to the crane, e.g. the main boom.

The action of the one or more adjustment actuators may be controlled by a control unit operating the adjustment actuators, e.g. based on a signals of one or more sensors measuring the motion(s) to be compensated and/or measuring the location of the object suspension device relative to a reference. For example, a reference position beacon is located on a supply vessel, e.g. temporarily, and the crane is mounted on another vessel, e.g. a drilling vessel, or another offshore structure. The control unit can then be configured to determine the actual position of the beacon relative to the object suspension device, and control the adjustment actuators to bring the suspension device at a desired location.

In an embodiment, the control unit operating the one or more adjustment actuators is linked to a camera system with one or more camera's that provide visual information on the location of the object suspension device relative to some reference and/or relative to an object that is to be connected to the object suspension device. One or more of the camera's may be provided on the inventive crane, e.g. on the crane housing, main boom, jib, and/or on the object suspension device.

In an embodiment, the control unit operating the one or more adjustment actuators is linked to an inertial motion sensing system, e.g. provided on the object suspension device, e.g. in view of control of motion of the object suspension device.

The mechanism allows for the horizontal motion and position of the object suspension device to be controlled accurately, e.g. in order to maintain the horizontal position of the object suspension device during connecting or disconnecting the object. This control is more effective and/or responsive and/or accurate and/or energy efficient, than controlling the horizontal position merely by combined slew motion and motion of the knuckle boom assembly.

The invention also relates to a marine knuckle boom crane comprising:

- a pedestal,
- a crane housing which is rotational relative to the pedestal about a vertical rotation axis,
- a knuckle boom assembly attached to the crane housing, the knuckle boom assembly comprising:
  - a main boom having an inner end which is connected pivotally about a first horizontal pivot axis to the crane housing, an outer end, a topside, a bottom side, and opposed lateral sides,
  - a jib connected via a pivot structure pivotally to the main boom, e.g. at the outer end thereof, the jib having a central longitudinal axis,
- a main boom luffing mechanism configured to pivot the main boom up and down relative to the crane housing,
- a jib pivoting mechanism configured to pivot the forked jib relative to the main boom, between a folded position of the knuckle boom assembly, wherein the jib is folded back relative to the main boom and extended positions of the knuckle boom assembly,
- a hoisting system comprising at least one departure sheave mounted on the jib, wherein the jib is a collapsible forked jib comprising first and second jib branches that are each pivotally mounted, such that the first and second jib branches are pivotal between a spread configuration of the forked jib wherein the jib branches are diverging laterally outward and a collapsed configuration wherein the jib branches are closer to the central longitudinal axis, e.g. said jib branches having a first jib tip and a second jib tip, respectively, a first departure sheave of the hoisting system being mounted on the first jib branch, e.g. proximate to the first jib tip, and the second departure sheave of the hoisting system being mounted on the second jib branch, e.g. proximate to the second jib tip, so that in a spread configuration the first and second departure sheaves are laterally spaced from one another at opposed lateral sides of a central longitudinal axis of the forked jib, wherein the hoisting system further comprises:

- a third departure sheave mounted to the main boom and/or to the crane housing,
- one or more winches, e.g. a first, a second, and a third winch, e.g. said one or more winches being mounted on the crane housing,
- a first cable driven by one of said one or more winches,
- a second cable driven by one of said one or more winches,
- a third cable driven by one of said one or more winches,
- an object suspension device configured to be connected to an object to be handled by the crane, wherein the first, the second, and the third cable are each connected to the object suspension device and each pass via the first, second, and third departure sheave, respectively, to the respective winch of said one or more winches, wherein the first, the second, and the third cable together define an inverted pyramid which diverges upwards from the object suspension device when handling the object.

The present invention also relates to a collapsible forked jib configured to be mounted to a main boom of a marine knuckle boom crane, the forked jib comprising first and second jib branches that are each pivotally mounted, such that the first and second jib branches are pivotal between a spread configuration of the forked jib wherein the jib branches are diverging laterally outward and a collapsed configuration wherein the jib branches are closer to the central longitudinal axis, e.g. said jib branches having a first jib tip and a second jib tip, respectively, a first departure sheave being mounted on the first jib branch, e.g. proximate to the first jib tip, and a second departure sheave being mounted on the second jib branch, e.g. proximate to the second jib tip, so that in a spread configuration the first and second departure sheaves are laterally spaced from one another at opposed lateral sides of a central longitudinal axis of the forked jib.

The invention also relates to an active suspension adjustment mechanism as described herein, wherein the active suspension adjustment mechanism is in the one-fold, two-fold or threefold actuated form.

The invention also relates to a crane having a hoisting system, comprising:

- a first departure sheave,
- a second departure sheave,
- a third departure sheave,
- one or more winches,
- a first cable driven by said one or more winches,
- a second cable driven by said one or more winches,
- a third cable driven by said one or more winches,
- an object suspension device configured to be connected to an object to be handled by the crane, wherein the object suspension device is provided with a first, a second, and a third return sheave, wherein the first, the second, and the third cable are each connected to the object suspension device in a multi-fall, preferably double-fall arrangement, and each pass from the respective winch via the first, second, and third departure sheave, to the respective first, second, and third return sheave, to a dead end of the cable, wherein the first, the second, and the third cable together define an inverted pyramid which diverges upwards from the object suspension device when handling the object, wherein the crane is provided with an active suspension adjustment mechanism as described herein.

The present invention also relates to a method for handling an object using the crane, wherein the active suspension adjustment mechanism is used to mainly horizontally position the object suspension device, possibly with the object connected thereto, and wherein the one or more winches are primarily used for vertical motion of the object suspension device.

For example, the crane is used in the transfer of objects from and to a floating vessel, e.g. in vessel-to-vessel transfer of objects, e.g. between a supply vessel and a drilling vessel.

The invention also relates to a vessel provided with a crane as described herein, e.g. a drilling vessel.

The crane and/or vessel may also be configured to be used for handling very large offshore structures, e.g. elongate and/or heavy structures, e.g. offshore wind turbines and/or foundations thereof, e.g. a pile, e.g. a monopile. For example the vessel may be a wind turbine installation vessel.

The invention also relates to a marine knuckle boom crane spreader type jib as described herein, configured to be mounted to the boom of a knuckle boom crane, e.g. as a retrofit of an existing knuckle boom crane.

The invention also relates to a method for retrofitting a marine knuckle boom crane, wherein the method comprises removal of the jib and fitting of a marine knuckle boom crane spreader type jib as described herein as well as the third departure sheave on the main boom or on the crane housing, as well as providing the three cable hoisting system as described herein.

The invention also relates to vessel-to-vessel transfer of objects wherein use is made of a crane as described herein, e.g. for transfer of objects between a supply vessel and a drilling vessel.

BRIEF DESCRIPTION OF THE DRAWINGS

The invention will now be described with reference to the appended drawings. In the drawings.

DETAILED DESCRIPTION OF EMBODIMENTS

Figure 1A:
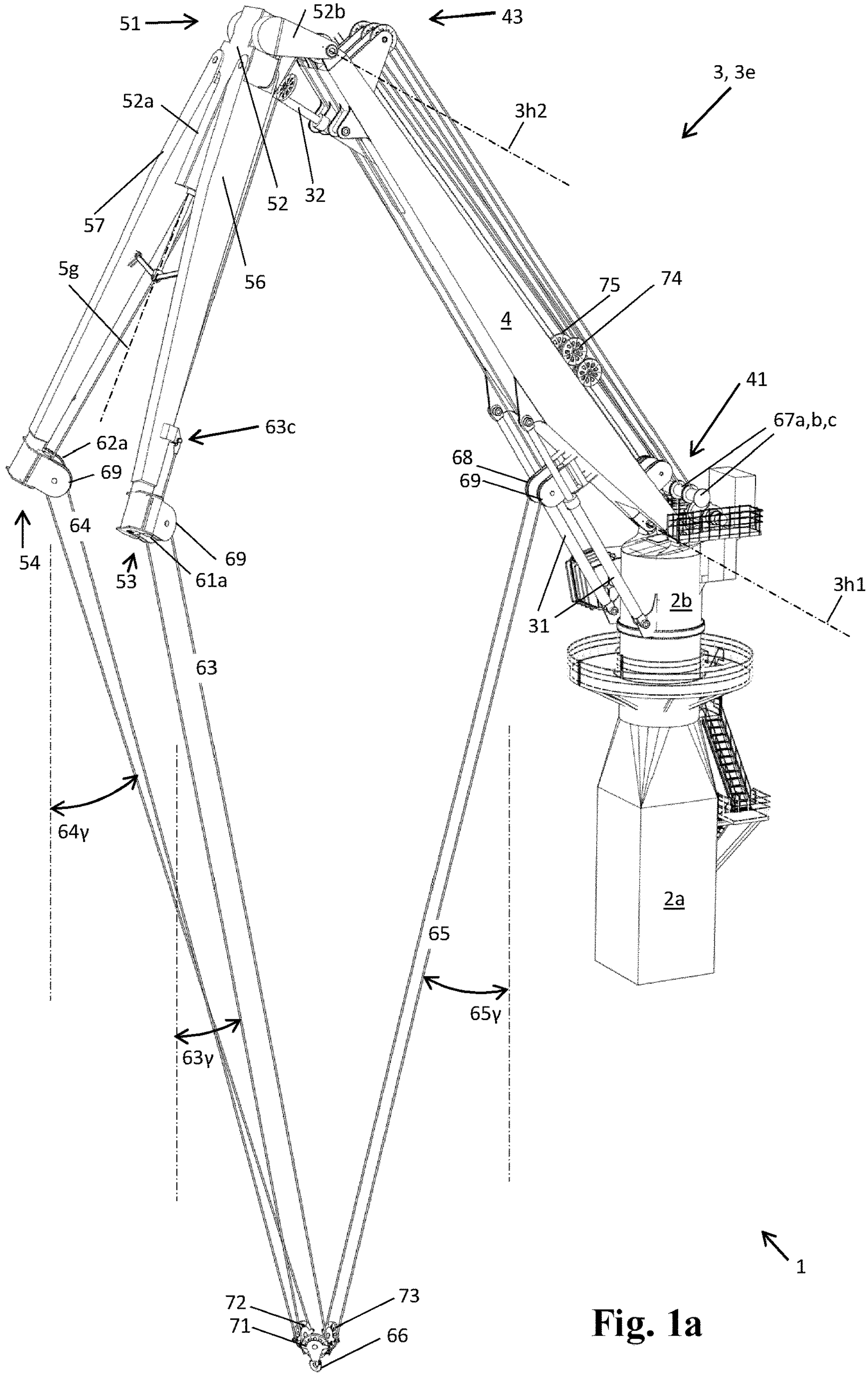
FIG. 1*a* shows in a perspective view a first embodiment of the crane according to the invention.
Figure 1B:
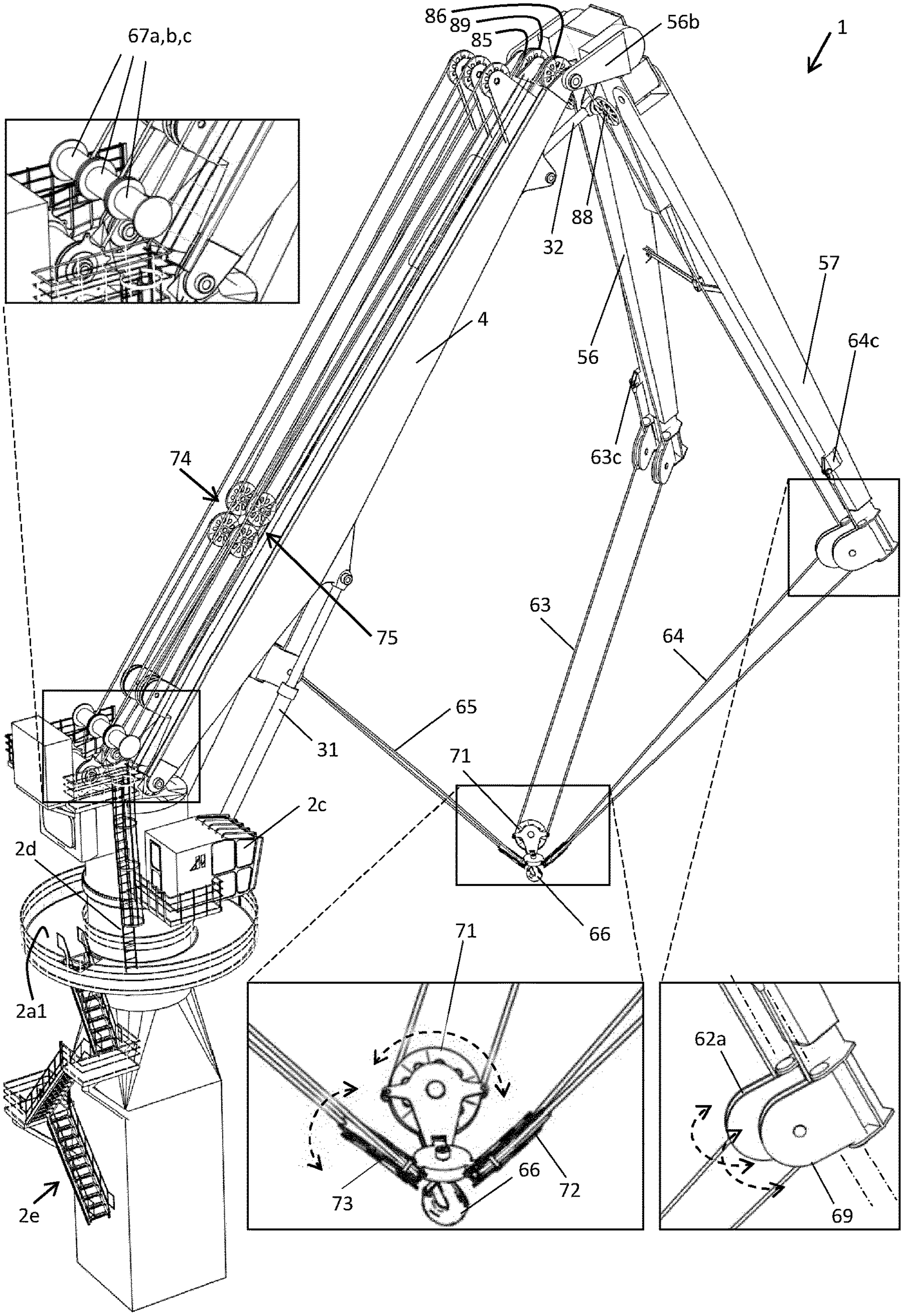
FIG. 1*b* shows the first embodiment in another perspective view, along with three magnifications of details.
Figure 1C:
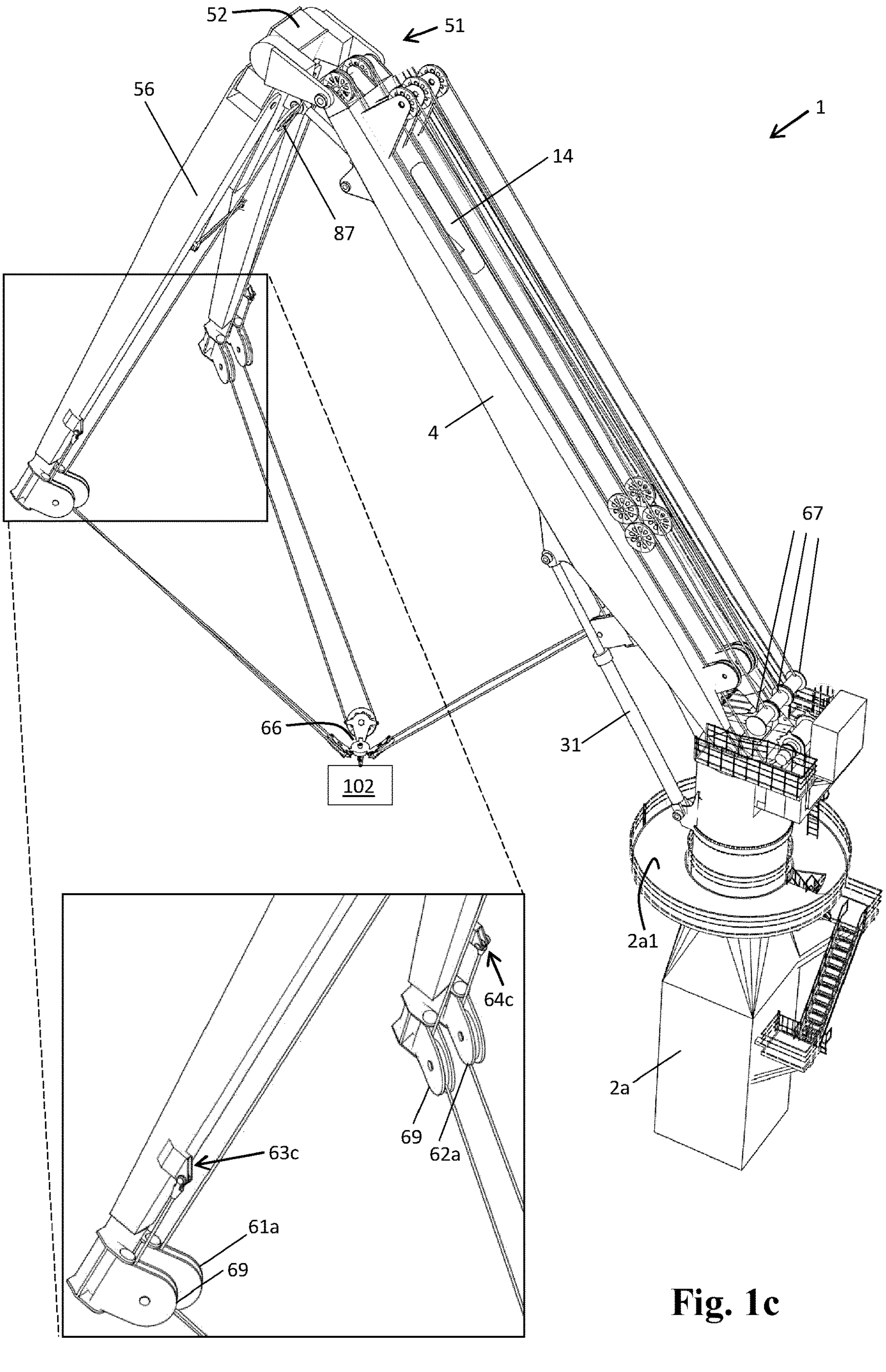
FIG. 1*c* shows the first embodiment in yet another perspective view, along with a magnification of another detail.
Figure 2A:
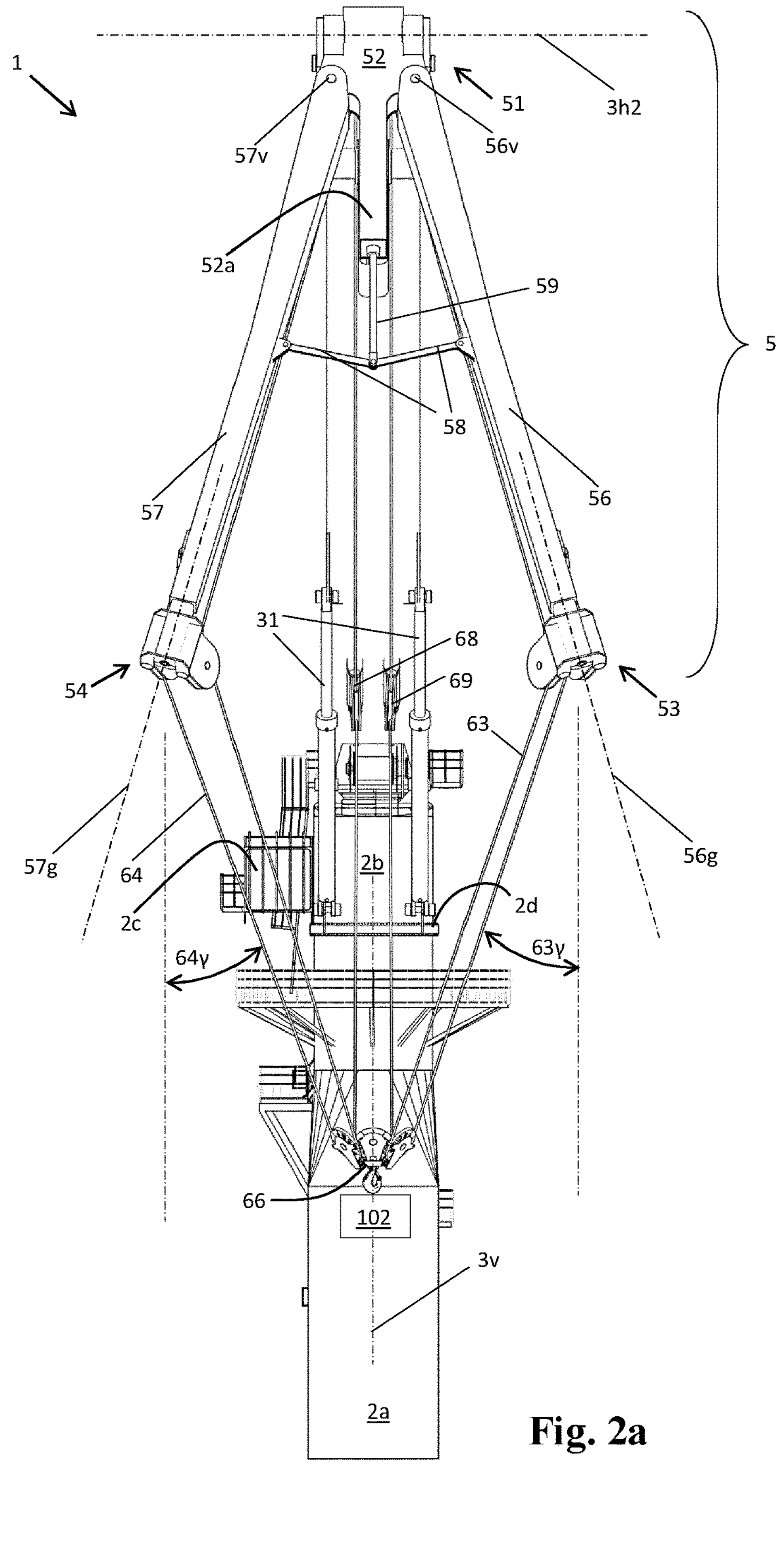
FIG. 2*a* shows the first embodiment in a front view.
Figure 2B:
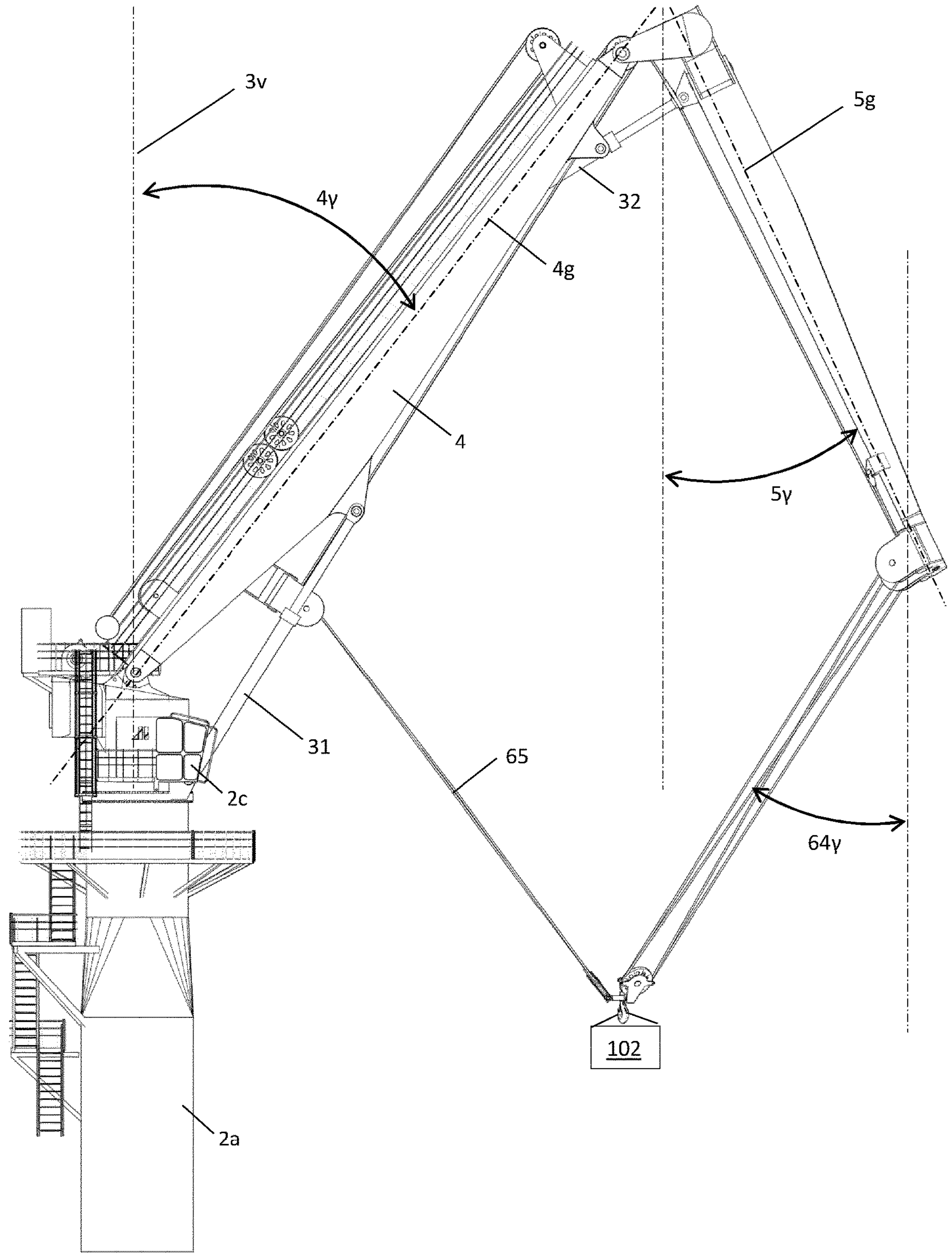
FIG. 2*b* shows the first embodiment in a side view.
Figure 2C:
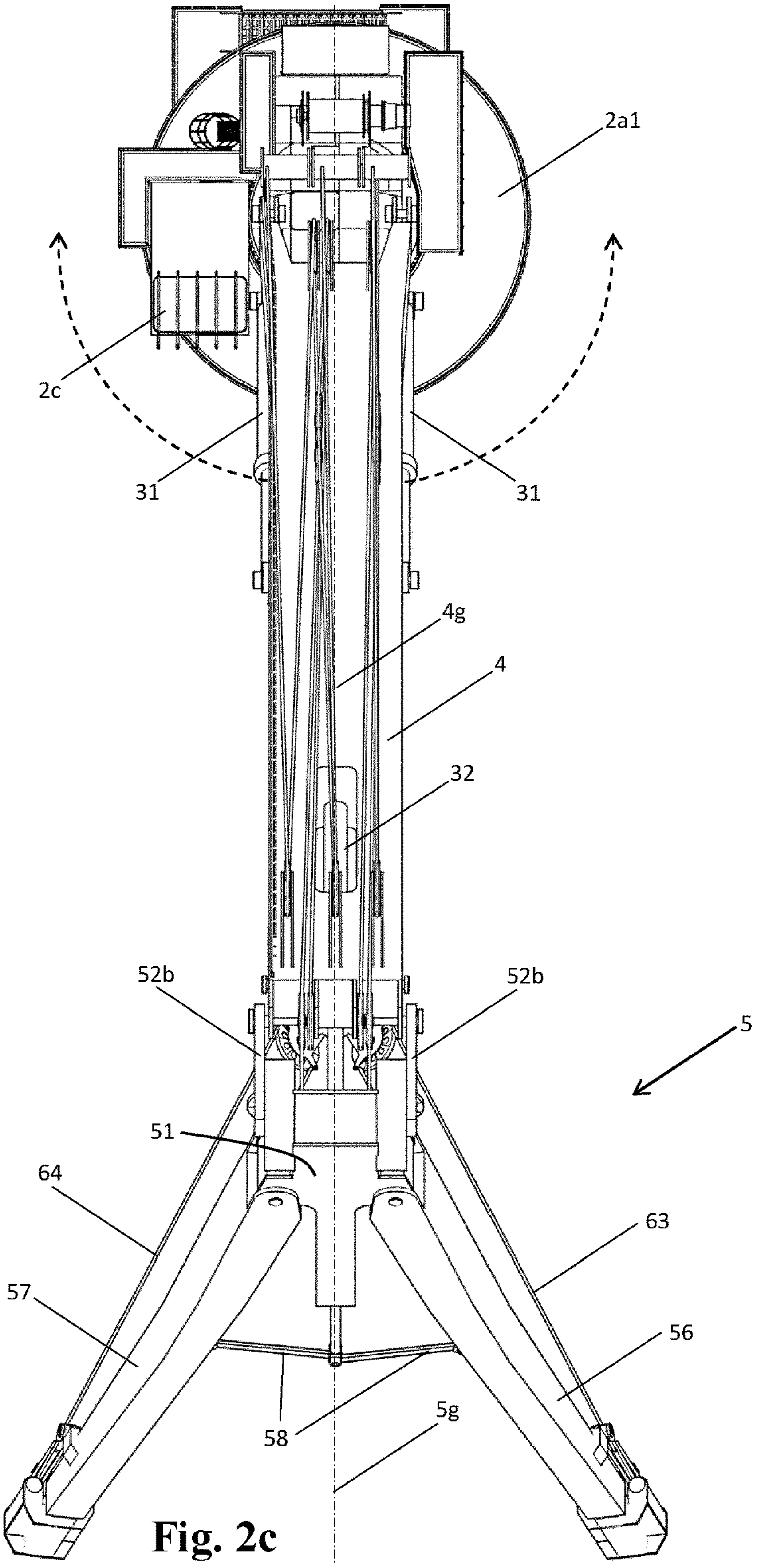
FIG. 2*c* shows the first embodiment in a top view.
Figure 2D:
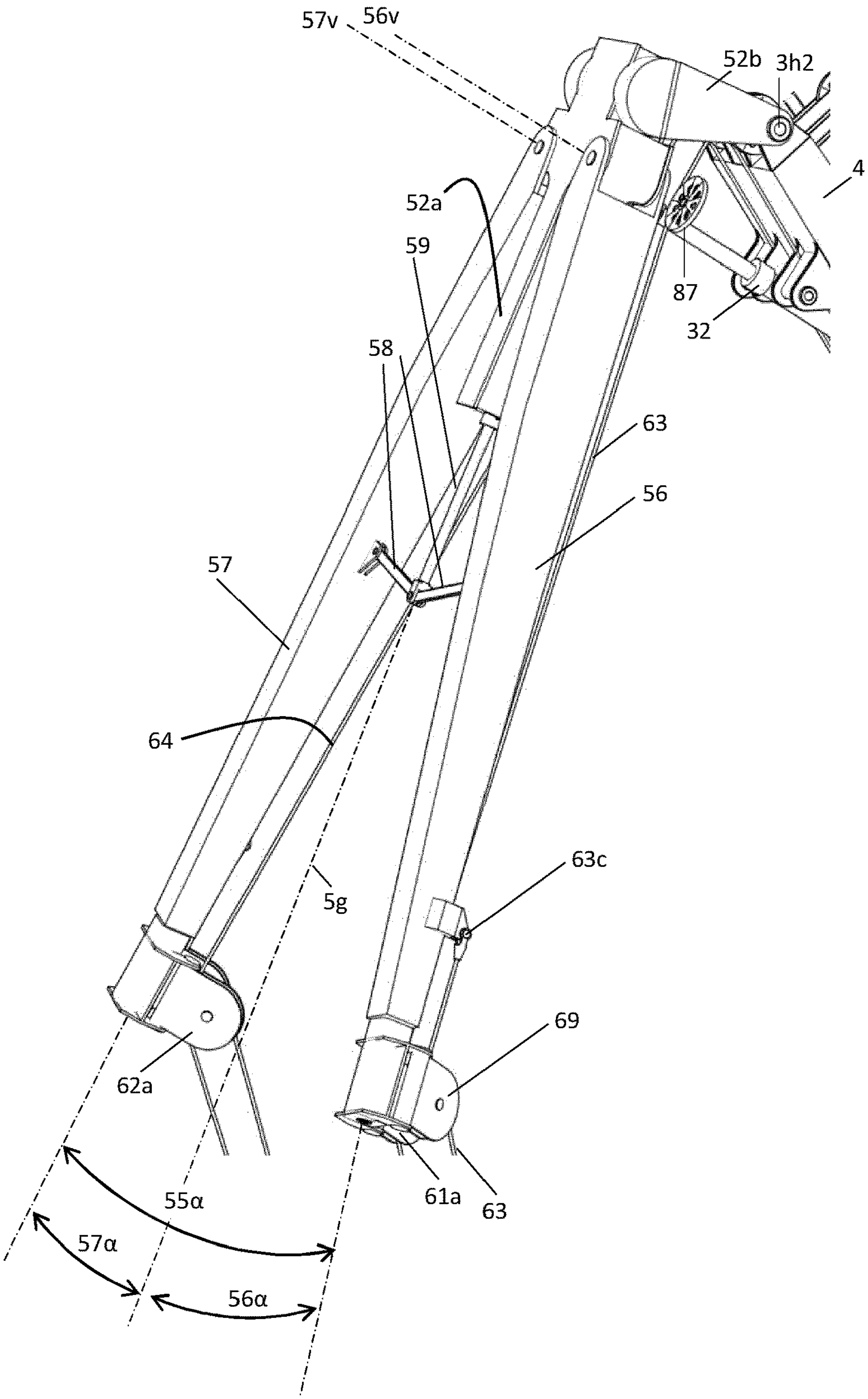
FIG. 2*d* shows the forked jib of the first embodiment.

The FIGS. 1, 2 and 3 illustrate a first embodiment of the marine knuckle boom crane 1 according to the invention. For example, the crane 1 is embodied to handle ISO shipping containers, e.g. 40 ft. containers, and other objects. For example, crates for transportation of drilling tubulars, e.g. drill pipe, casing pipe, are to be handled by the crane. For example, the object to be handled may have a maximum weight of 50 tons. As explained herein, the inventive concepts may be applied to larger and smaller cranes than illustrated in the drawings.

The marine knuckle boom crane 1 comprises a pedestal 2*a*, a crane housing 2*b* which is rotational relative to the pedestal 2*a* about a vertical rotation axis 3*v*, and a knuckle boom assembly 3 attached to the crane housing 2*b*. A slew bearing 2*f* is present between the pedestal 2*a* and the crane housing.

The pedestal 2*a* may be a closed contour, hollow box type pedestal, e.g. of a four sided horizontal cross-section as shown. Other embodiments, e.g. as a cylindrical hollow pedestal or as an open framework are also possible, for example.

The crane housing 2*b*, in this example, is provided with an operators cabin 2*c* for accommodating a human crane operator.

The pedestal 2*a* is provided with an access platform 2*a*1 extending about the pedestal 2*a* and the crane housing 2*b* is provided with a ladder 2*d* allowing the crane operator to gain access to the operators cabin 2*c* via the access platform and the ladder. For example, as here, the pedestal is provided with a stair arrangement 2*e* to gain access to the elevated access platform 2*a*1.

The knuckle boom assembly 3 is composed of a main boom 4 and a spreader type jib 5, here a collapsible forked jib.

The main boom 4 has an inner end 41 which is connected pivotally about a first horizontal pivot axis 3*h*1 to the crane housing 2*b* and has an outer end 43. The main boom 4 is a rigid, unitary structure, e.g. of steel.

The main boom has a top side 4*a*, a bottom side 4*b*, and opposed lateral sides. The cross-section of the main boom may be, e.g. over a major portion of its length, rectangular, as shown, but other cross-sections, e.g. cylindrical, triangular, oval, octagonal, are also possible.

A main boom luffing mechanism, here comprising a pair of parallel hydraulic cylinders 31, is mounted between the housing 2*b* and the main boom 4 and is configured to provide luffing motion of the main boom 4 relative to the crane housing 2*a*.

In another embodiment of the luffing mechanism, the crane housing 2*a* is extended upwards, above the luffing pivot axis, and a cable type luffing mechanism extends between an elevated position of the housing, e.g. the top of the housing, and the main boom.

Being attached to the crane housing 2*b*, the knuckle boom assembly 3 is, rotational relative to the pedestal 2*a* about a vertical rotation axis 3*v*. This is commonly referred to as a slew motion of the crane 1. Preferably, the housing 2*b* can revolve about 360 degrees, but more limited slew ranges are also possible. A slew drive is provided to effect the slew motion about axis 3*v*.

The forked jib 5 comprises:

- a jib base 52 that is connected pivotally about a second horizontal pivot axis 3*h*2 to the main boom 4, here to the outer end 43 thereof as is preferred,
- a first jib branch 56 and a second jib branch 57 having a first jib tip 53 and a second jib tip 54, respectively. Herein the first jib branch and second jib branch diverge from the jib base 52 laterally outwardly relative to a central longitudinal axis 5*g* of the forked jib 5, such that the first jib tip 53 is arranged spaced from the second jib tip 54 in a lateral direction with respect to the central longitudinal axis 5*g*.

A forked jib pivoting mechanism 32, here with a single hydraulic cylinder 32, is mounted between the main boom 4 and the jib base 52 and is configured to pivot the forked jib 5 relative to the main boom 4 for folding and extending of the jib 5.

The cylinder body of cylinder 32 is connected to the underside of the main boom 4 at the gland side of the cylinder body, so where the piston rod extends from the cylinder body. The main boom 4 is provided with a slot 14 in proximity of this cylinder 32 allowing for the cylinder body to move into the slot, e.g. when folding the jib to the most folded position. As preferred, the slot 14 extends from the bottom side to the top side of the main boom 4 allowing the cylinder to protrude above the main boom during folding.

As explained herein, in alternative designs, pivoting of the main boom and/or of the jib may be effected by a mechanism comprising a winch and a cable. For example, the jib 5 may be embodied with a lever structure opposite from the spreader type structure relative to the pivot about axis 3*h*2. A cable mechanism can then be employed for extending the jib. If desired, a pull-in cable and winch can be provided to pull the jib into the complexly folded position.

The crane 1 further comprises a hoisting system 6, which includes:

- a first departure sheave 61*a* on the first jib branch 56, here mounted proximate to the first jib tip 53,
- a second departure sheave 62*a* on the second jib branch 57, here mounted proximate to the second jib tip 54,
- a third departure sheave 68 mounted to the main boom 4,
- one or more winches, here a first, a second, and a third winch 671, 67*b*, 67*c*, said one or more winches here being mounted on the crane housing 2*b*,
- a first cable 63 driven by the first winch 67*a*,
- a second cable 64 driven by the second winch 67*b*,
- a third cable 65 driven by the third winch 67*c*,
- an object suspension device 66 configured to be connected to an object 102 to be handled by the crane 1.

As can be seen, the first, the second, and the third cable 63, 64, 65 are each connected to the object suspension device 66 and each pass via the first, second, and third departure sheave 61*a*, 62*a*, 68, respectively, to the respective winch. The first, the second, and the third cables 63, 64, 65 together define an inverted pyramid which diverges upwards from the object suspension device 66 when handling the object 102.

In the FIGS. 1, 2, and 3, the object suspension device 66 is suspended via each of the first, second, and third cables 63, 64, 65 in a double-fall, arrangement. The hoisting system 6 further comprises for the first, second and third hoisting cable a respective first, second, and third return sheave 71, 72, 73 connected to the object suspension device 66 over which the first, second and third hoisting cables are run, respectively.

The forked jib 5 here is a collapsible forked jib, in which the first and second jib branches 56, 57 are each pivotally mounted to the jib base 52 about respective jib branch pivot axes 56*v*, 57*v*, such that the first and second jib branches 56,57 are pivotal between a collapsed configuration (FIG. 3*b*) and a spread configuration of the forked jib 5.

Each of the first and second jib branches 56,57 is pivotal between:

- a collapsed position in which the branch extends parallel to the central longitudinal axis of the forked jib (FIG. 3*b*),
- one or more spread positions in which the angle 55α between the diverging first jib branch 56 and second jib branch 57 is between 20° and 80°, e.g. 40° as shown, e.g. the respective jib branch angles 56α,57α both having an angle of 20° relative to the central longitudinal axis 5$g$ of the forked jib.

FIG. 5$a$ shows the crane 1, here two cranes 1, being mounted at the side of the deck box a semi-submersible vessel 101, here a drilling vessel 101, to facilitate transfer of objects between the vessel 101 and a supply vessel 105.

It can be seen in FIG. 5$a$, that when folded, a rigid forked jib would require considerable space in case the entire jib is to be parked within the contour of the deck of the vessel. The latter is a common requirement. The provision of a collapsible jib allows for the folded knuckle boom assembly to have dimensions similar to prior art knuckle boom cranes. This allows for parking of the folded boom parallel to the side of the vessel.

In this embodiment of FIG. 1, the first and second jib branches 56, 57 are symmetrically pivotal into one spread configuration of the forked jib, here by a common jib branch actuator 59, so that the respective jib branch angles 56α,57α relative to the central longitudinal axis 5$g$ of the forked jib are equal to one another.

In this example, the one jib branch actuator 59 is configured to drive a pivoting of the first and of the second jib branch 56,57 to vary the angle 55α of divergence between them. Here, the one jib branch actuator 59 is arranged between the jib base 52 and both of the jib branches 56, 57. In an alternative embodiment, an actuator 59 is arranged between the jib branches 56, 57.

In more detail, the FIGS. 1,2, and 3 show that the collapsible forked jib 5 comprises a jib branch actuator, e.g. linear jib branch actuator, e.g. a cylinder 59, that is mounted to the jib base 52 and is configured to extend and contract such as to move a mobile section thereof, e.g. a piston rod, along the central longitudinal axis 5$g$. The collapsible forked jib 5 further comprises a first and second transverse bar 58, each being pivotally connected to the mobile section with one longitudinal end thereof, and with another longitudinal end thereof to the first and second branch 56, 57, respectively, such that extension and contraction of the jib branch actuator 59 pivots each of the jib branches 56, 57 about the respective pivot axis 56$v$, 57$v$ via the transverse bars 58 and moves the jib branches between the collapsed configuration and the spread configuration.

It is shown, that the transverse bars 58 and the jib branch actuator 59 form a locking mechanism configured to secure the jib branches 56,57 in a spread configuration, e.g. so as to withstand a collapsing due to the object being handled by the crane and the cables 63, 64 urging the jib branches 56, 57 to the collapsed configuration. Another locking mechanism to avoid uncontrolled collapsing of the jib branches can also be provided.

For example, as shown here, the first and second transverse bars 58 are pivotal into a locking position, e.g. an overcentre position in which the inner ends of the bars 58 have been moved beyond an imaginary line through the outer ends of the bars 58 so that collapsing of the jib branches is only possible by actuated motion of the inner ends by the actuator 59. This is shown in FIG. 3$c$, for example.

The winches 67$a$, $b$, $c$ are distinct and independently operable winches. In an embodiment, one or more of the winches 67$a$,$b$,$c$ are embodied as AHC-winches.

The winches 67$a$, $b$, $c$ are mounted on the crane housing 2$b$ as is preferred.

A cable guide sheave 85 for the first cable 63 and a cable guide sheave 86 for the second cable 64 are mounted at the outer end 34 of the main boom 4, here rotatable about an axis coinciding with the second horizontal pivot axis 3$h$2 as is preferred.

A further guide sheave 87 for the first cable 63 and a guide sheave 88 for the second cable 64 are mounted to the jib base 51, e.g. each revolving about an axis coinciding with the respective jib branch pivot axis 56$v$, 57$v$.

A cable guide sheave 89 for the third cable 65 is mounted at the outer end of the main boom 4, with the cable 65 passing from the respective winch 67$c$, along the top side of the main boom, to said sheave. There the cable 65 is guided to the underside of the main boom 4, to extend to the third departure sheave.

The FIGS. 1, 2, and 3 show that the jib base 52 has a main body 52$a$ that is provided with laterally spaced bracket arms 52$b$ at the inner end, which arms 52$b$ each connect via pivot to the main boom 4 at the outer end 43 thereof. The jib branches 56, 57 are each pivotally connected to the main body 52$a$ of the jib base.

It is shown that the third departure sheave 68 is attached to the main boom 4. As an alternative the sheave is attached to the crane housing 2$b$, or to a structure extending between the main boom 4 and the crane housing 2$b$, e.g. to the pivot mechanism for the main boom.

The third departure sheave 68 is located between the pair of boom pivoting cylinders 31, so closer to the inner end of the main boom 4 than the points where the boom pivoting cylinders 31 engage on the main boom.

The position of the third departure sheave 68 is closer to the inner end 41 of the main boom 4 than the position of any of the departure sheaves 61$a$, 62$a$ on the jib branches 56, 57 when the knuckle boom assembly 3 is in a folded position (FIG. 4$a$) thereof. This, for example, allows for the enhanced stabilization of the object suspension device 66 irrespective of the angular orientation of the main boom 4 and the jib 5. So, as shown in FIG. 1, even when hoisting is done at relatively closer range to the pedestal 2$a$, a stabilizing relative wide angle between the cables 63, 64, 65 is obtained.

For example, the pedestal 2 is configured to be stationary secured, e.g. welded, to a vessel or to another offshore structure. For example, as illustrated, the vessel 101 is a floating drilling vessel, e.g. a semi-submersible type vessel for drilling subsea wellbores. For example, the pedestal is welded on the deck box structure of the vessel at a side thereof.

For example, as illustrated, the pedestal 2 is secured to the outer side of the deck box structure of a semi-submersible vessel or to the outer side of the hull of another type of vessel.

For example, the crane 1 is to be used for the transfer of an object 102 between the deck of a supply vessel 105 and the deck of another vessel 101, the crane being mounted on said other vessel.

For example, the crane 1 is mounted on a vessel having a deck wherein the object is to be lifted that is located higher than the deck of the supply vessel 105. It will be appreciated that a similar transfer of objects is present between a supply vessel 105 and a stationary offshore platform. Commonly, in the situation of a supply vessel 105, the crane 1 will be arranged on the other vessel or offshore platform having the higher deck.

The objects 102 to be handled are, for example, drilling tubulars, e.g. crates containing drilling tubulars such as drill pipe or casing pipe. Or the objects are shipping containers, or any other object.

The main boom 4 has a longitudinal main boom axis 4$g$, an inner end 41, and an outer end 43.

The inner end 51 of the jib 5 is connected pivotally about a second horizontal pivot axis 3$h$2 to the outer end 43 of the main boom 4, such as to enable adjustment of the jib angle 5γ of the jib 5.

As shown in the figures, the jib 5 is pivotal about the second horizontal pivot axis 3$h$2 at least between extended positions 3$e$ of the knuckle boom assembly 3 and a folded position 3$f$ of the knuckle boom assembly 3 in which the jib 5 is folded back under the main boom 4, e.g. in view of compact parking of the crane when not in use.

In the folded position, for example, the central longitudinal axis 5$g$ may extend generally parallel along the underside of the main boom 4. Accordingly, in the folded position 3$f$ the jib angle 5γ may approach zero.

The knuckle boom assembly can be parked in folded position, with the main boom 4 being generally horizontal, with or without the use of a boom rest, as is known in the art.

It may also be possible to park the knuckle boom assembly in an extended position, e.g. with the jib branches resting on a support, e.g. on a deck of the vessel, e.g. the jib branches being spread in the parked position to provide an extra stable parked position.

For example, as here, the object suspension device 66 is embodied with a hook.

For example, the hook is a swivelling hook that can be swivelled about a vertical axis in the device 66. For example, the swivel motion is controlled by a swivel drive of the device 66.

In an embodiment, the object suspension device 66 includes a lifting frame suspended from the hook, with the lifting frame being connectable to an object to be handled, e.g. an elongated crate or shipping container.

In an embodiment, the object suspension device 66 and/or any lifting frame to be suspended therefrom for connecting to an object to be handled is provided with a gyroscopic stabilizer.

It is shown that the third departure sheave 68 is located at a position along the longitudinal axis 4$g$ of the main boom 4 relatively proximate the inner end 41 of the main boom 4, which results in relatively large vertical angles of the cables 63, 64, 65, facilitating the stability and controllability of the object suspension device 66 and the connected object 102.

The position of the third departure sheave 68 is in a direction along the longitudinal axis 4$g$ of the main boom 4 closer to the inner end 41 than the jib tips 53, 54 and/or sheaves 61$a$,62$a$ when the knuckle boom assembly 3 is in the completely folded position 3$f$. This creates stability for the object suspension device in operation of the crane. It also makes that the third cable 65 extends, in the longitudinal direction 4$g$ of the main boom 4, at the side of the object suspension device 66 at which the inner end 41 of the main boom 4 is located, and the first and second cable 63, 64 extend longitudinally at the other side of the object suspension device 66. This may result in a reduced risk for entanglement of the cables 63, 64, 65 and in a more convenient running of the cables over the departure sheaves 61$a$, 62$a$, 68.

The pivoting of the jib 5 around the second horizontal pivot axis 3$h$2 is driven by controlled extension and contraction of a hydraulic cylinder 32 which is operable between the main boom 4 and the jib 5, being pivotally mounted to the main boom and to the jib base 52.

FIGS. 1, 2, and 3 show that the jib branches 56, 57 make up the major part of the jib length and the jib base 52 makes up only a minor part, so that the forked jib 5 essentially has the shape of a V when in the spread configuration.

It is illustrated, that the first and second jib branches 56, 57 are each pivotally mounted to the jib base 52, so that the first and second jib branch are pivotal towards and away from the central longitudinal axis 5$g$ of the jib 5 around respective jib branch pivot axes 56$v$, 57$v$. The pivotability of the jib branches 56, 57 results in a changeability of the lateral distance between the departure sheaves 61$a$, 62$a$.

In this embodiment the jib branches 56, 57 are pivotal in unison, the jib branch angles 56α, 57α with respect to the central longitudinal axis 5$g$ of the jib 5 remaining equal to each other.

FIG. 1$a$ shows the first departure sheave 61$a$ and a first guide sheave 69 being mounted laterally adjacent to one another proximate the first jib tip 53. It shows the reeving of the first cable 63 via the first departure sheave 61$a$ to the first return sheave 71, back to the guide sheave 69 and a dead end fixing location 63$c$, where it is fixed to the jib branch 56.

Similarly, the second cable 64 runs via the second departure sheave 62$a$ mounted proximate the second jib tip 54 to the second return sheave 72, back to a second guide sheave 69 mounted laterally adjacent the second departure sheave 62$a$ and to a dead end fixing location 64$c$, where it is fixed to the jib branch 57.

The adjacent arrangement of the departure sheaves 61$a$, 62$a$ and the first and second guide sheaves 69 as well as the fixing locations 63$c$, 64$c$ are shown in detail.

It is also shown that the third departure sheave 68 and the third guide sheave 69 over which the third hoist cable 65 runs, are mounted adjacent one another on the boom 4.

Referring in particular to FIG. 1$b$, the departure sheaves 61$a$, 62$a$, and the first and second guide sheaves 69, are each pivotal about an axis parallel to the longitudinal axis 56$g$, 57$g$ of the first and second jib branch 56, 57 respectively.

FIGS. 1,2 show in detail an embodiment of the arrangement of the first, second and third winches 67$a,b,c$ on the crane housing 2, and the extension of respectively the first, second and third hoist cable 63, 64, 65 therefrom.

Furthermore they show in detail an embodiment of the pivotal mounting of the departure sheave and the associated guide sheave mounted adjacent thereto proximate the jib tip. These are mounted pivotally around the indicated pivot axes, e.g. parallel to the longitudinal axis of the jib branch, the pivot directions also being indicated.

As best seen, also the third departure sheave 68 and the adjacent third guide sheave 69 may be mounted in the same fashion to the boom 4 to be pivotal. The pivotal mountings enables these sheaves to remain aligned with the hoist cables at different vertical hoist cable departure angles 63γ, 64γ, 65γ thereof.

FIG. 1$b$ shows a detail of the pivotal mounting of the return sheaves 71, 72, 73 to the object suspension device 66. The return sheaves are pivotal in two perpendicular directions, a first being indicated for the first return sheave 71 and a second for the second return sheave 72. The pivotability facilitates the functioning of the departure sheaves 61$a$, 62$a$, 68 as it allows for the alignment thereof with the cables at different vertical departure angles of the cables 63γ, 64γ, 65γ, e.g. which may change during hoisting and lowering of the object and during pivoting of the jib branches 56, 57.

FIGS. 2$a$-$d$ indicate the longitudinal axes 4$g$, 5$g$, 56$g$, 57$g$, of respectively the main boom 4, the jib 5, the first and second jib branch 56, 57, the first and second horizontal pivot axis 3$h$1, 3$h$2 and the main boom angle 4γ and 5γ resulting from pivoting the main boom 4 and the jib 5 there around.

To facilitate the operation of the departure sheaves 61*a*, 62*a*, 68, alignment thereof with the cables 63, 64, 65 while respective vertical angles 63γ, 64γ, 65γ change is enabled by the crane 1. The departure sheaves 61*a*, 62*a*, are thereto pivotally mounted to the first and second jib tip 53, 54, respectively, such as to allow alignment thereof with the first and second cable 63, 64 while the vertical angles 63γ, 64γ change, including during hoisting and lowering of the object suspension device 66 and pivoting of the boom 4 and/or the jib 5 around the horizontal pivot axes 3*h*1, 3*h*2. The third departure sheave 68 is pivotally mounted to the main boom 4 as well in a similar fashion to allow alignment with the third hoist cable 65.

The FIGS. 1, 2, and 3 also illustrate the provision of a two-fold actuated active suspension adjustment mechanism 7. This mechanism 7 is explained in more detail with reference to FIGS. 6*a-d*.

In an embodiment, one or both jib branches are also configured for securing a tool to the jib tip thereof, e.g. a line grabbing tool, e.g. for use in anchor handling operations.

FIGS. 3*a-c*, 4*a-c* show a second embodiment of the crane 1 according to the invention. The crane 1 largely corresponds to the crane according to the first embodiment, so that the above description relating thereto applies to this second embodiment as well.

The hoisting system 6 of the crane 1 according to the second embodiment comprises, in addition to the first departure sheave 61*a*, also a fourth departure sheave 61*b* which is also mounted to the first jib tip 53. The hoisting system 6 also comprises, in addition to the second departure sheave 62*a*, a fifth departure sheave 62*b*, mounted to the second jib tip 54. Whether in the second embodiment the first cable 63 extends from the first or fourth departure sheave 61*a/b*, and whether the second cable 64 extends from the second or fifth departure sheave 62*a/b*, depends on the position of the jib 5.

Figure 4A:
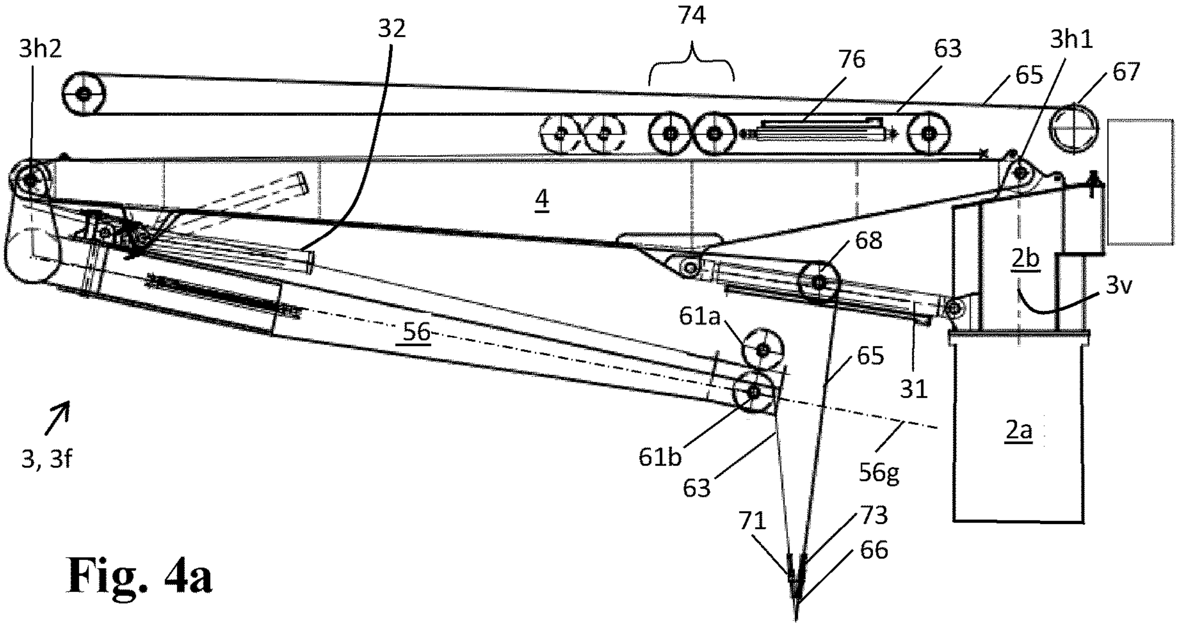
FIG. 4*c* shows the second embodiment in a side view in three positions.
Figure 4B:
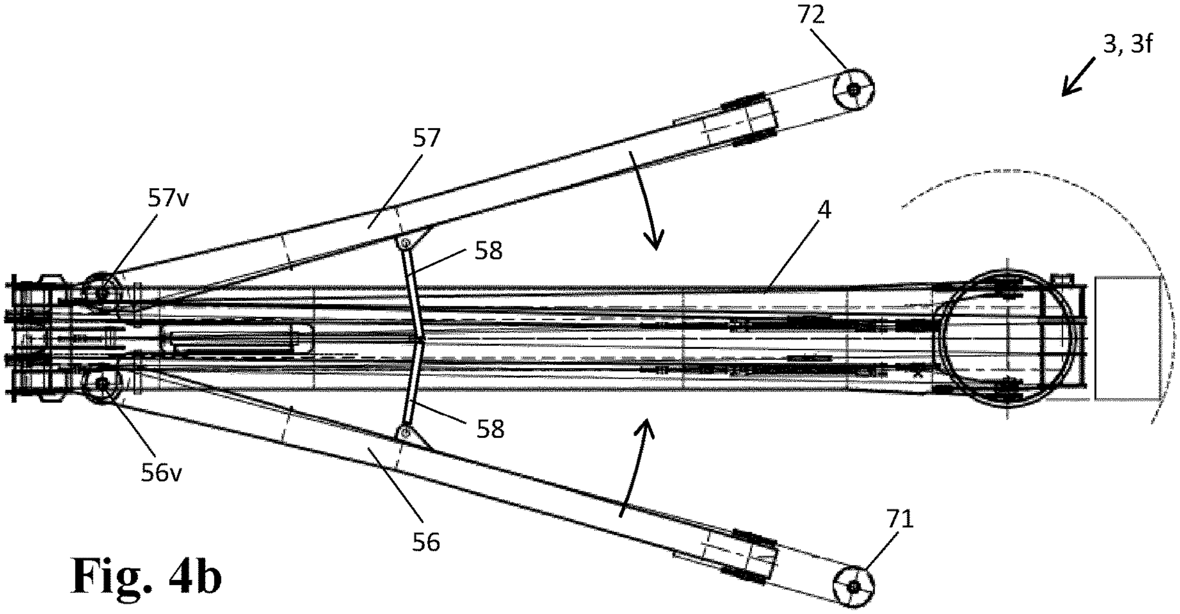
Figure 4C:
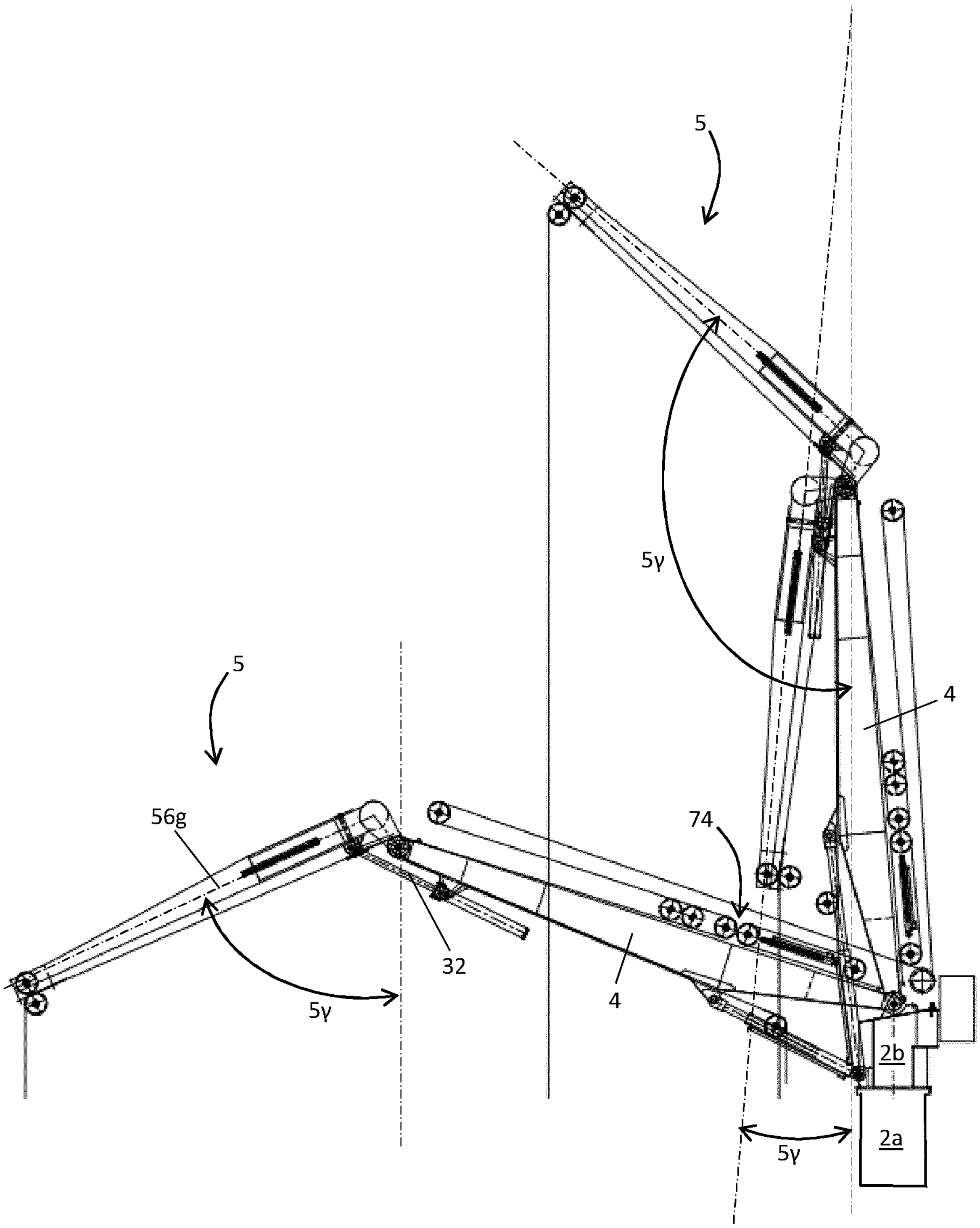

The first and fourth departure sheave 61*a*, 61*b* are mounted to the first jib tip 53 such as to extend in the same plane, with the first cable 63 running in between the first departure sheave 61*a* and fourth departure sheave 61*b*, such that in more folded positions of the jib 5 the first cable 63 runs over the fourth departure sheave 61*b*, see FIG. 4*a*. In more extended positions of the jib 5, shown in FIG. 5*b*, the first cable 63 runs over the first departure sheave 61*a*.

Correspondingly the second and fifth departure sheave 62*a*, 62*b* are mounted to the second jib tip 54 such as to extend in the same plane, with the second cable 64 running in between the second departure sheave 62*a* and fifth departure sheave 62*b*, such that in some folded positions of the jib 5 the second cable 64 runs over the fifth departure sheave 62*b*, and in the more extended positions of the jib 5 the second cable 64 runs over the second departure sheave 62*a*.

Possibly, in an embodiment, with the jib 5 in a compactly folded position, the crane 1 is capable of hoisting the object 102 with the jib 5 at only a small angle with the main boom 4 so that the jib tips 53, 54 are close to the main boom 4, as shown in FIG. 4*a*. The upwardly diverging inverted pyramid configuration of the cables 63, 64, 65 is maintained, so that the benefits thereof are also maintained in this position of the jib 5. Furthermore the inverted pyramid configuration is maintained while moving the jib from this folded position to a more extended or forward position, e.g. while hoisting.

Figures 3A, 3B, 3C:
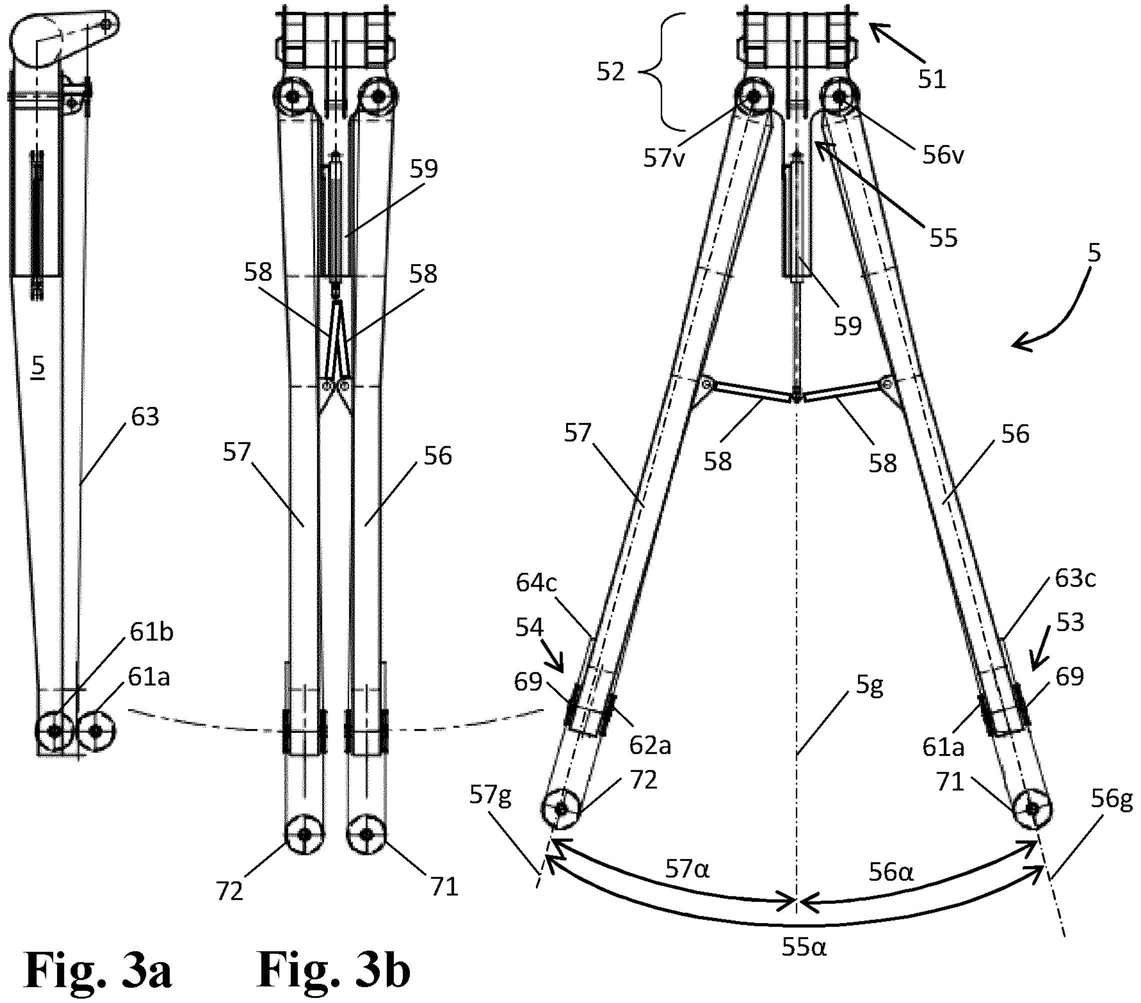
FIG. 3*a-c* show in a side and two top views the jib of a second embodiment of the crane according to the invention, FIG. 4*a,b* show in a side and top view the second embodiment of the crane according to the invention.

FIG. 3*b* shows the jib branches 56, 57 in a collapsed configuration and FIG. 3*c* in a spread configuration. As discussed in relation to the first embodiment, the jib branches 56, 57 are by the operation of the cylinder 59 pivotal with respect to the central longitudinal axis 5*g* of the jib 5 around respective jib branch pivot axes 56*v*, 57*v*. The transverse bars 58 are shown in the locking position in FIG. 3*c*.

That the object suspension device 66 is suspended via the cables 63, 64, 65 in a double-fall arrangement, is visible in FIG. 4*a*, showing the first and third return sheave 71, 73. The double-fall arrangement has been discussed for the first embodiment and is applicable for this embodiment as well.

The crane 1 comprises, as preferred, an active suspension adjustment mechanism 7. A preferred embodiment thereof is schematically shown in FIGS. 6*a-d* together with the hoisting system 6. Components of the mechanism 7 are also visible in other illustrations of the crane 1, yet the structure and operation can best be understood with reference to FIGS. 6*a-d*.

The FIGS. 6*a-d* show a twofold actuated active suspension adjustment mechanism 7.

In general terms the mechanism 7 allows for substantially horizontal motion of the object suspension device 66 while the knuckle boom assembly 3 remains in a constant position, thus maintaining jib angle 5γ and the boom angle 4γ and while the winches 67*a-c* are stationary. Of course, operation of the mechanism may be combined with motion of the knuckle boom assembly 3 and/or with variation of length of one or more of the cables 63, 64, 65 when desired.

Figure 5A:
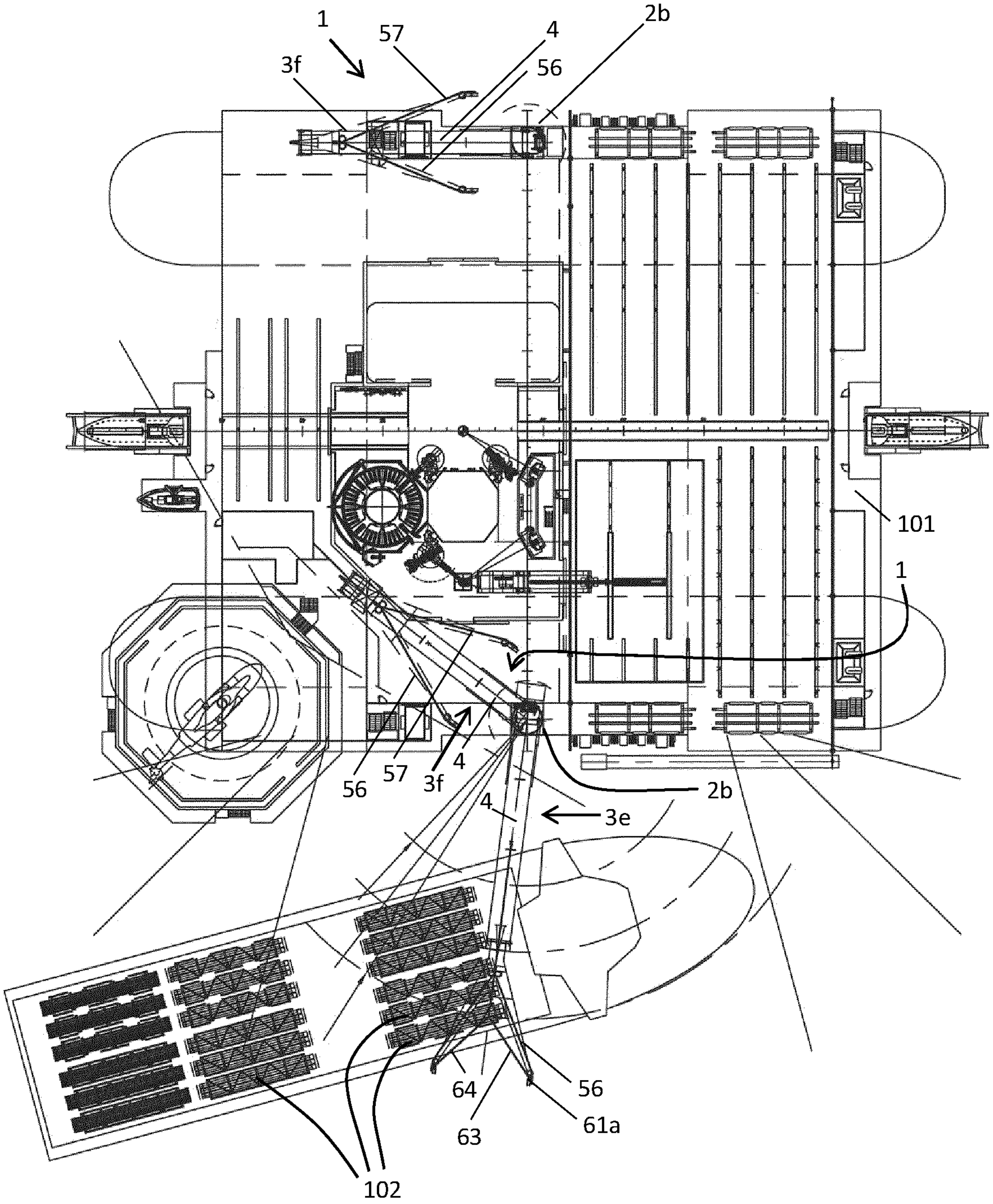
FIG. 5*a* shows the crane of FIGS. 4*a,b* on a floating drilling vessel for transfer of objects between said drilling vessel and a supply vessel, FIGS. 5*b,c* show the crane on the drilling vessel in multiple positions, FIG. 6*a-c* schematically show in a two-dimensional visualisation the hoisting system and the active suspension adjustment system according to the invention, FIG. 6*d* schematically shows in a three-dimensional visualisation the hoisting system and the active suspension adjustment system of FIGS. 6*a-c,*
Figure 5B:
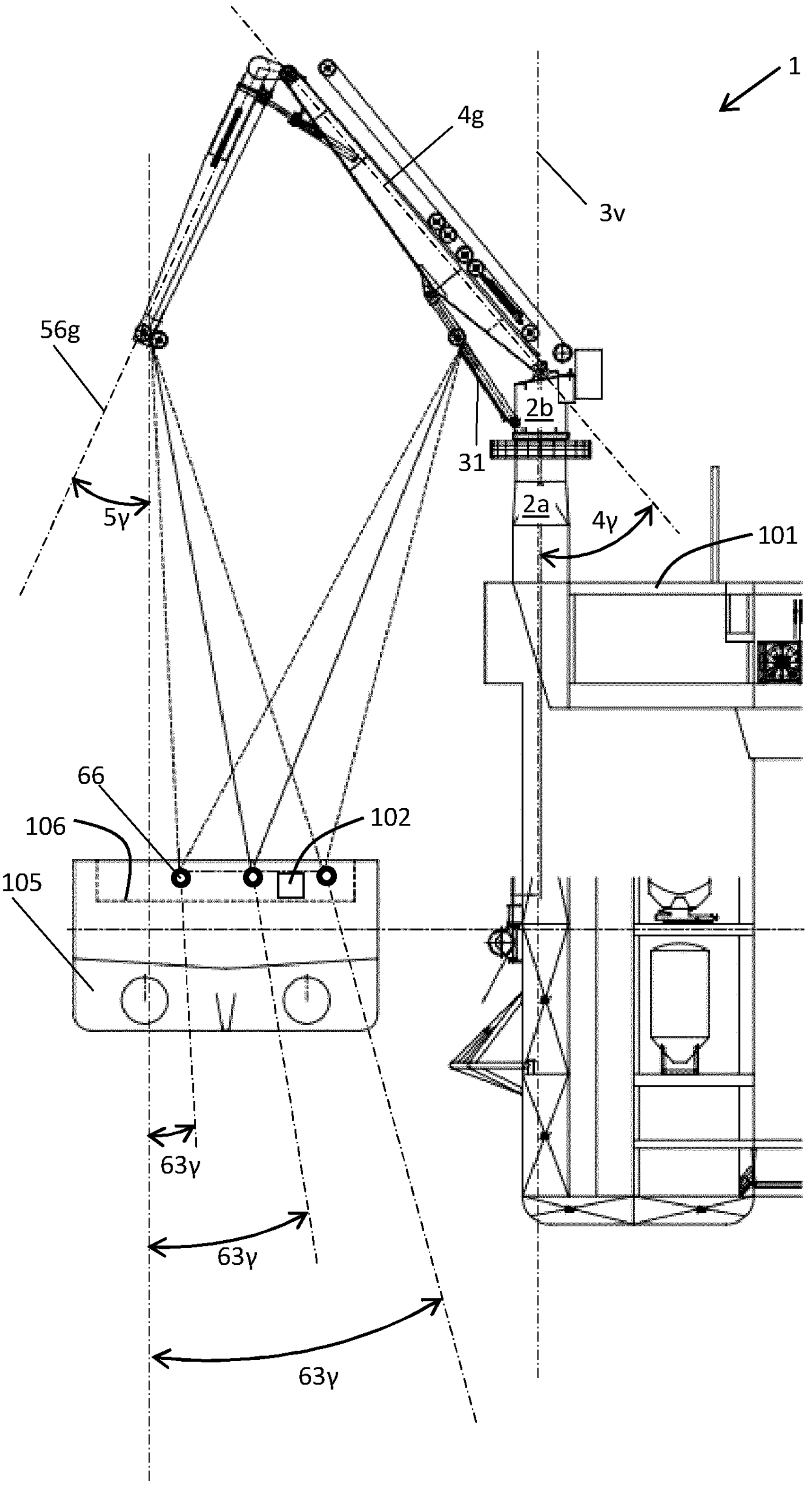

For understanding the mechanism 7 it is easier, to consider the situation wherein the knuckle boom assembly 3 remains in a constant position and wherein the winches 67*a-c* are stationary. FIG. 5*b* illustrates the operation of the mechanism 7. It is shown that the mechanism 7 is used to position the object suspension device 66 in a horizontal plane.

In more detail, FIG. 5*b* illustrates that the mechanism 7 is used in the process of positioning the device 66, possibly with an object 102, relative to a supply vessel 105, here a deck 106 thereof. As usual the supply vessel 105 has an accommodation superstructure 107, including a bridge, at the bow of a supply vessel, with the deck 106 aft thereof.

This positioning is, for example, done as part of the transfer of an object 102 between the supply vessel 105 and another vessel 101, e.g. a drilling vessel. For example, as shown in FIG. 5*a*, the supply vessel 105 is loaded with objects 102 on the deck 106 thereof that are to be lifted onto the higher deck of the other vessel 101 by the crane 1 arranged on said other vessel 101. For example, as in FIG. 5*a*, the objects 102 are crates filled with tubulars, e.g. drill pipes, casing pipes, etc.

In order to connect the device 66 to a selected object 102 on the deck, the positioning of the device 66 at an appropriate location above the object 102 to be lifted from the deck is required. Doing so by slewing of the crane 1 and/or folding/extending of the boom assembly 3 and/or motion of the jib branches 56, 67 (when possible) is difficult, e.g. due to inertia of these rather heavy components. The mechanism 7 allows for a more attractive positioning of the device 66.

Figure 5C:
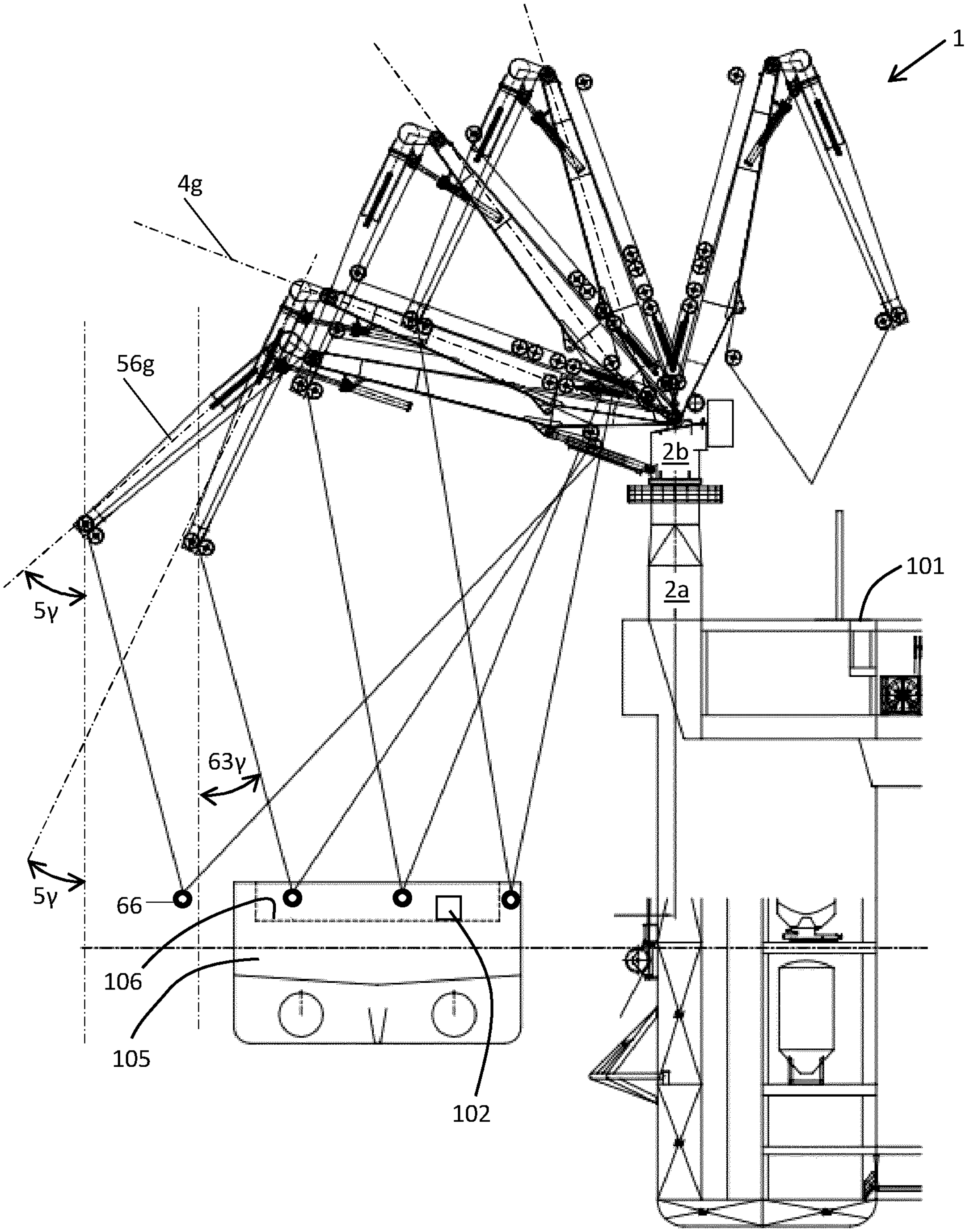

The operation of mechanism 7 is illustrated in FIG. 5*b*. As preferred, in an embodiment, the crane 1 and the mechanism 7 is such, that merely by operation of the mechanism 7 the device 66 can be horizontally moved and positioned at various locations distributed over the deck 106 of the supply vessel. The FIG. 5*c* illustrates that in absence of mechanism 7, or without using mechanism 7, significant motion of the boom assembly 3 is necessary to effect the same horizontal displacement of the device 66. As mentioned, a combination of operation of mechanism 7 and motion of the crane, e.g. folding/extending the boom assembly, is also possible.

Figure 6A:
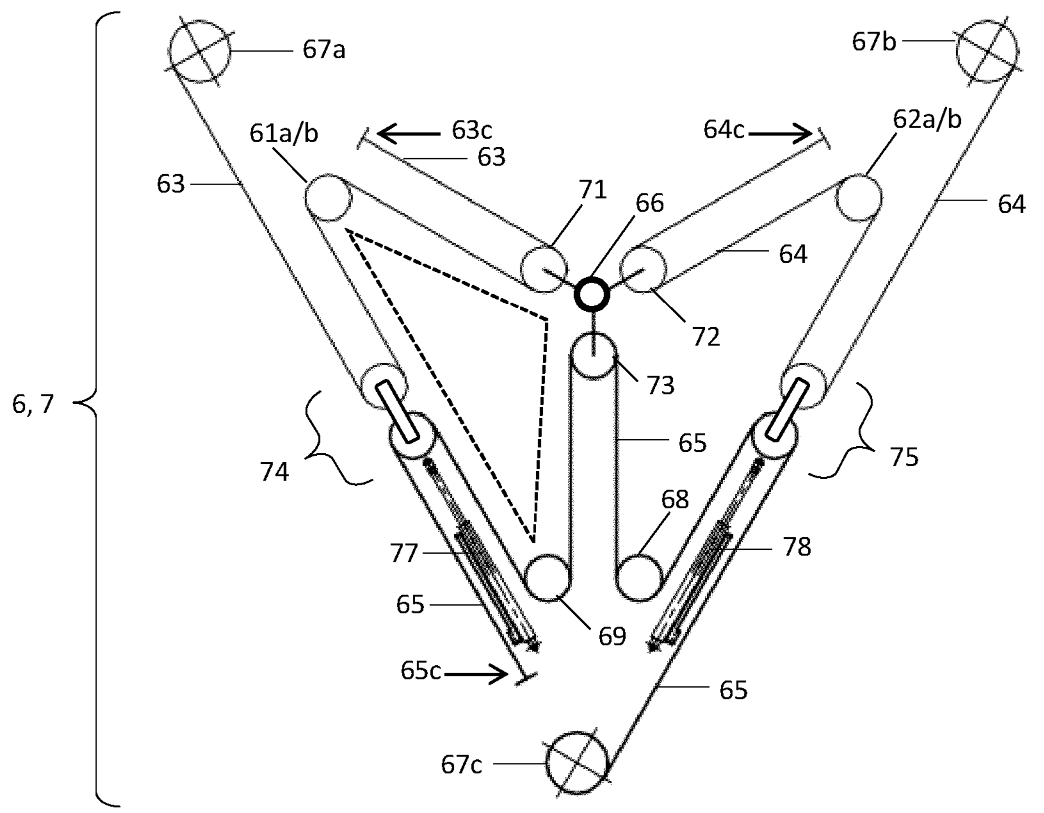
FIGS. 6*e-f* schematically show in a two-dimensional visualisation the hoisting system and another active suspension adjustment system according to the invention, FIG. 6*g* schematically shows in a three-dimensional visualisation the hoisting system and the active suspension adjustment system of FIGS. 6*e-f,*

FIG. 6*a* shows schematically and in a two-dimensional view, without regard to the physical structure and locations of the parts of the hoisting system 6 and of the active suspension adjustment mechanism 7 on the crane 1, how these parts interact with each other, in order to give insight in the working principle of the two-fold active adjustment mechanism 7.

Figure 6B:
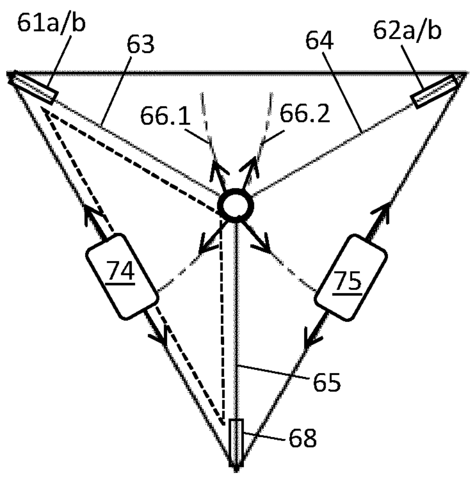
Figure 6C:
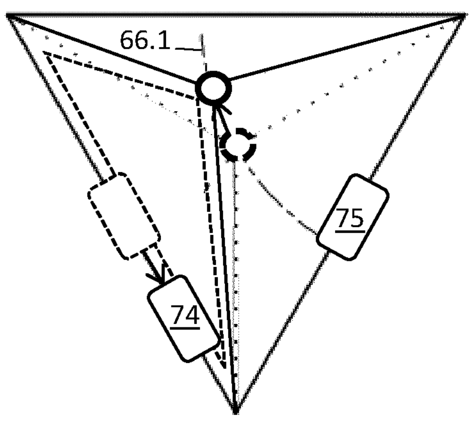
Figure 6D:
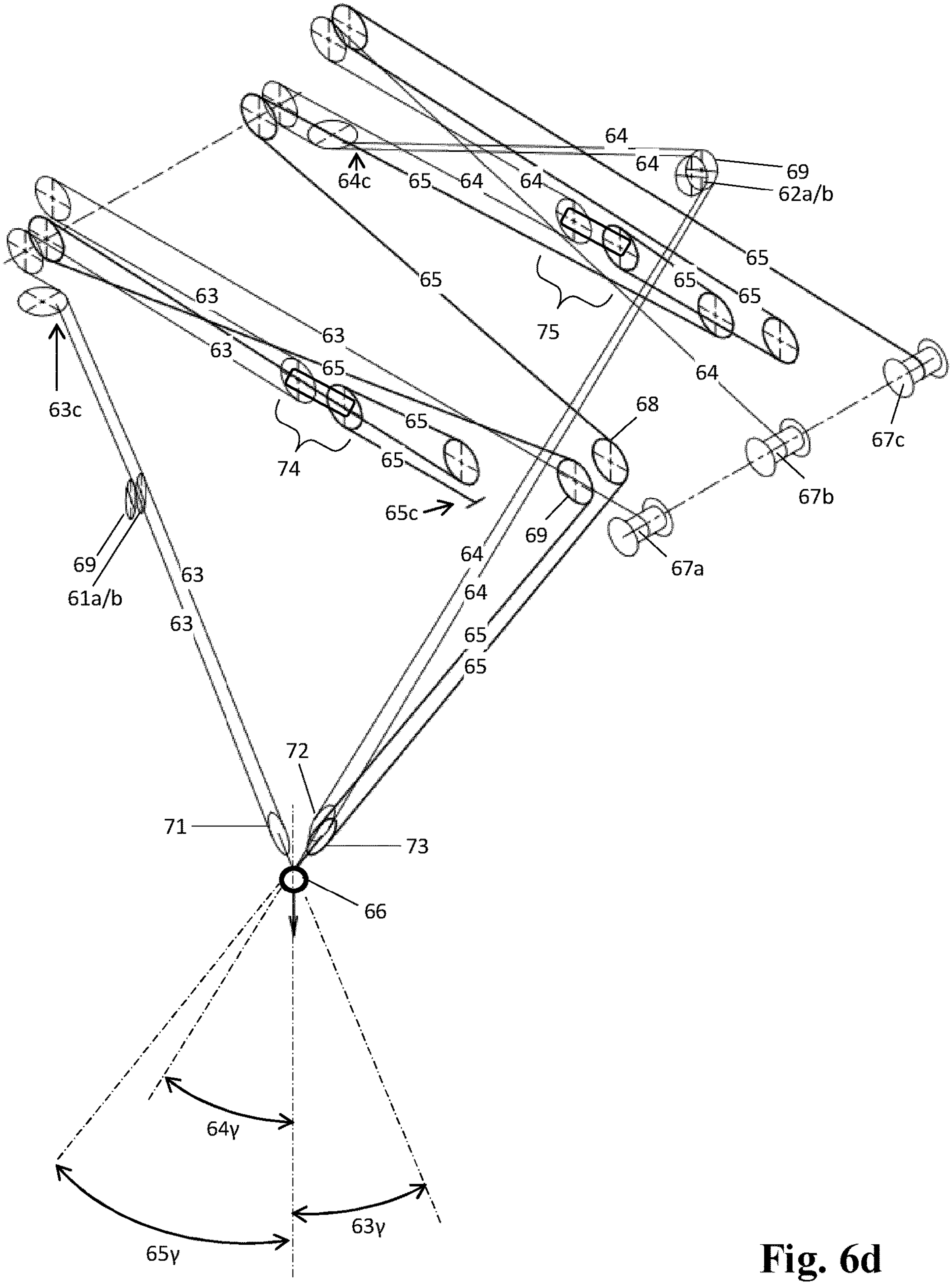

The effect of the operating this adjustment mechanism 7 is shown in a simplified manner in FIGS. 6*b* and 6*c*. FIG. 6*d* shows the arrangement of the parts of the hoisting system 6 and the adjustment mechanism 7 in a three-dimensional view.

The twofold actuated active suspension adjustment mechanism 7 comprises a first sheave pair 74 and a second sheave pair 75. Each of the sheave pairs 74,75 comprises a primary sheave and a secondary sheave which are interconnected such as to enable a pair of the first, second, and third cables 63, 64, 65 to run over one sheave of the pair in opposite directions.

The mechanism 7 further comprises a first adjustment actuator 77 and a second adjustment actuator 78, each configured for moving respectively the first and second sheave pair 74,75 in the direction of the pair of cables run over the sheaves. In FIG. 1 the actuators 77, 78 have not been shown. Due to the cables extending in opposite directions, the sheave pair is loaded by the weight of the object in opposed directions and as a result the same load is not placed on the actuator 77, 78. This is beneficial in view of the requirements for these actuators, there connection to the main boom, when present, and for the dynamic control of these sheave pairs 74, 75.

As preferred, the sheave pairs 74,75 and the adjustment actuators 77, 78 are mounted on the main boom 4, e.g. with the one or more winches 67*a-c* being mounted on the crane housing 2*b*. As preferred, the sheave pairs 74,75 and the adjustment actuators 77, 78 are mounted on a topside of the main boom 4. In another embodiment, the sheave pairs are mounted each along one of the lateral sides of the main boom 4. In another, more complex, embodiment, the mechanism 7 is placed on or in the crane housing, or even in the pedestal or below deck.

As preferred, the sheave pairs 74, 75 are mobile in longitudinal direction of the main boom 4 over a motion range, the motion being governed by the respective adjustment actuator 77, 78.

The first cable 63 is reeved from the respective winch 67*a* via:

the primary sheave of the first sheave pair 74,
the first departure sheave 61*a*,
the first return sheave 71, to a location on the first jib branch 56 where a dead end 63*c* of the first cable 63 is fixed.

The second cable 64 is reeved from the respective winch 67*b* via:

the primary sheave of the second sheave pair 75,
the second departure sheave 62*a*,
the second return sheave 72, to a location on the second jib branch 57 where a dead end 64*c* of the second cable 64 is fixed.

The third cable 65 is reeved from the respective winch 67*c* via:

the secondary sheave of the second sheave pair 75,
the third departure sheave 68,
the third return sheave 73,
a third guide sheave 69 paired with the third return sheave 68 on the main boom or on the crane housing,
the secondary sheave of the first sheave pair 74, to a location on the main boom or the crane housing where a dead end 65*c* of the third cable 65 is fixed.

The first adjustment actuator 77 is configured to move the first sheave pair 74 such as to selectively increase or decrease the part of the length of the first cable 63 between the respective winch 67*a* and the first departure sheave 61*a* and simultaneously decrease or increase the part of the length of the third cable 65 between the third guide sheave 69 and the dead end 65*c* of the third cable.

The second adjustment actuator 78 is configured to move the second sheave pair 75 such as to selectively increase or decrease the part of the length of the second cable 64 between the respective winch 67*b* and the second departure sheave 62*a* and simultaneously decrease or increase the part of the length of the third cable 65 between the winch 67*c* and the third departure sheave 68.

As shown here, preferably, the first and second adjustment actuators 77,78 are each embodied as a first and second adjustment cylinder, e.g. hydraulic cylinder, each of which has one longitudinal end thereof fixed to the main boom 4 and another longitudinal end to the associated sheave pair 74,75, respectively, such that a shortening or lengthening of the first and/or second adjustment actuator cylinder 77, 78 respectively moves the first and/or second sheave pair 74, 75 in the directions of the cables run over the sheaves thereof.

The effect of this mechanism is illustrated in FIGS. 6*b-c*. Therein the triangular interconnection of the cables 63, 64, 65 is shown in a simplified manner, the dotted imaginary triangle of FIG. 6*a* being indicated for verification.

The object suspension device 66 is represented by the same circle as in FIG. 6*a*, being connected to the three cables 63, 64, 65.

In the simplified top view of FIG. 6*b* the curved trajectory 66.1 illustrates the motion of the device 66 as only the sheave pair 74 is moved by the corresponding adjustment actuator 77. The curved trajectory 66.2 illustrates the motion of the device 66 as only the sheave pair 75 is moved by the corresponding adjustment actuator 78. The curved trajectories 66.1, 66.2 over which the device 66 is moved in the horizontal plane is determined by the locations of the departure sheaves 61*a*, 62*a*, 68, and the length of the cables between the device 66 and the departure sheaves. This trajectory is curved as a result of the inverted pyramidal arrangement of the cable suspension.

By purposely combining motions of the sheave pairs 74, 75, e.g. by shortening and/or lengthening of the cylinders 77, 78, components of the two trajectories 66.1, 66.2 are combined allowing to move the object suspension device 66 along other trajectories in the horizontal plane. For example, shortening of both cylinders 77, 78 by the same amount moves the object suspension device 66 over a straight trajectory, in FIGS. 6*b-c* upwards and in FIG. 5*b* to the left, so in a forward direction of the crane 1 and along the central longitudinal jib axis 5*g*. Correspondingly, lengthening of both cylinders 77, 78 by the same amount moves the object suspension device 66 over a straight trajectory downwards in FIGS. 6*b-c*, so in a backward direction of the crane 1 and to the right in FIG. 5*b*.

In FIG. 6*c* it is illustrated that the object suspension device 66 has been moved substantially horizontally by shifting the sheave pair 74.

In another embodiment, a threefold actuated suspension adjustment mechanism 7 is provided instead of the twofold actuated suspension adjustment mechanism 7 of FIGS. 6*a-d*.

Figure 6E:
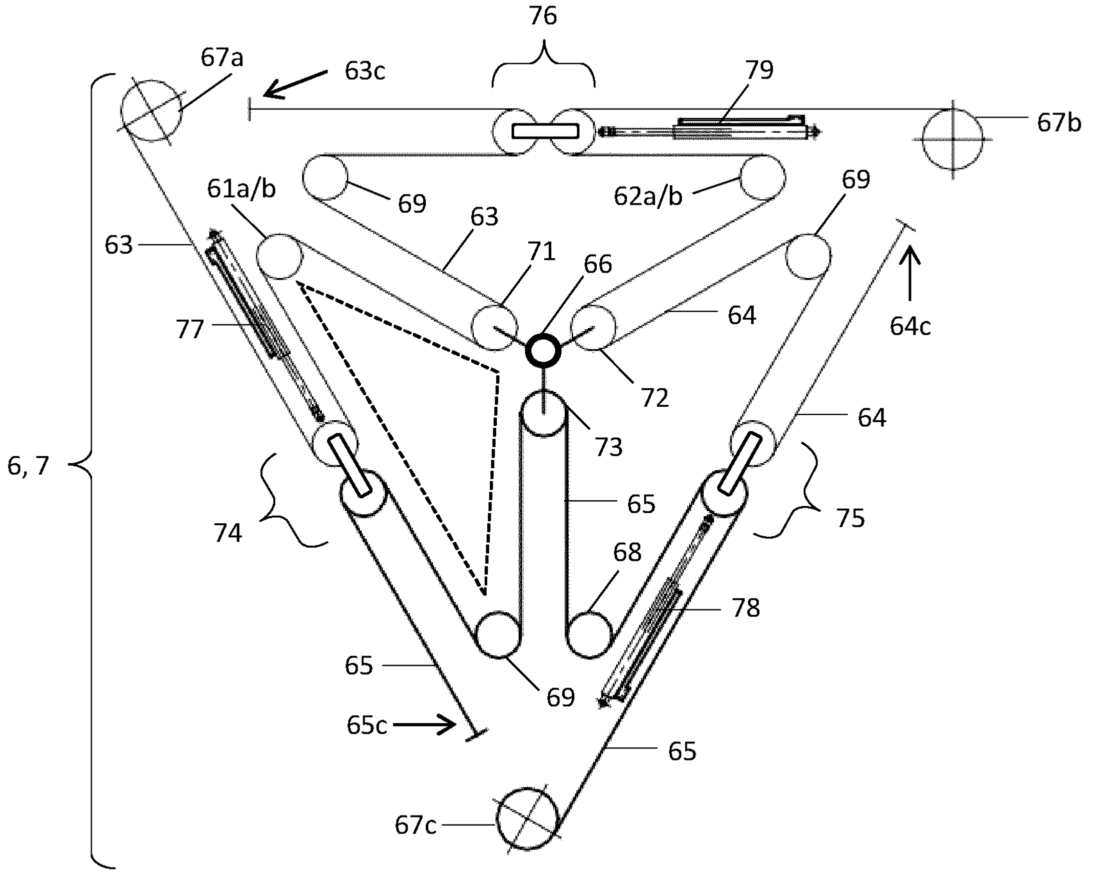
Figure 6F:
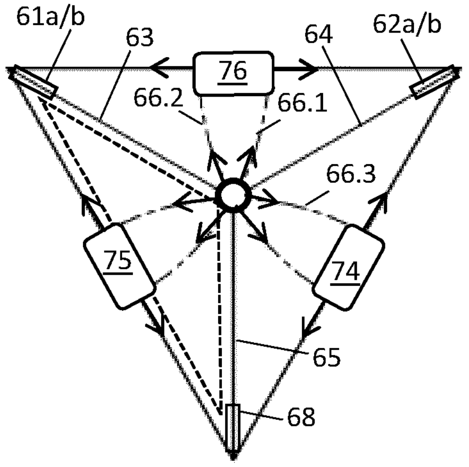
Figure 6G:
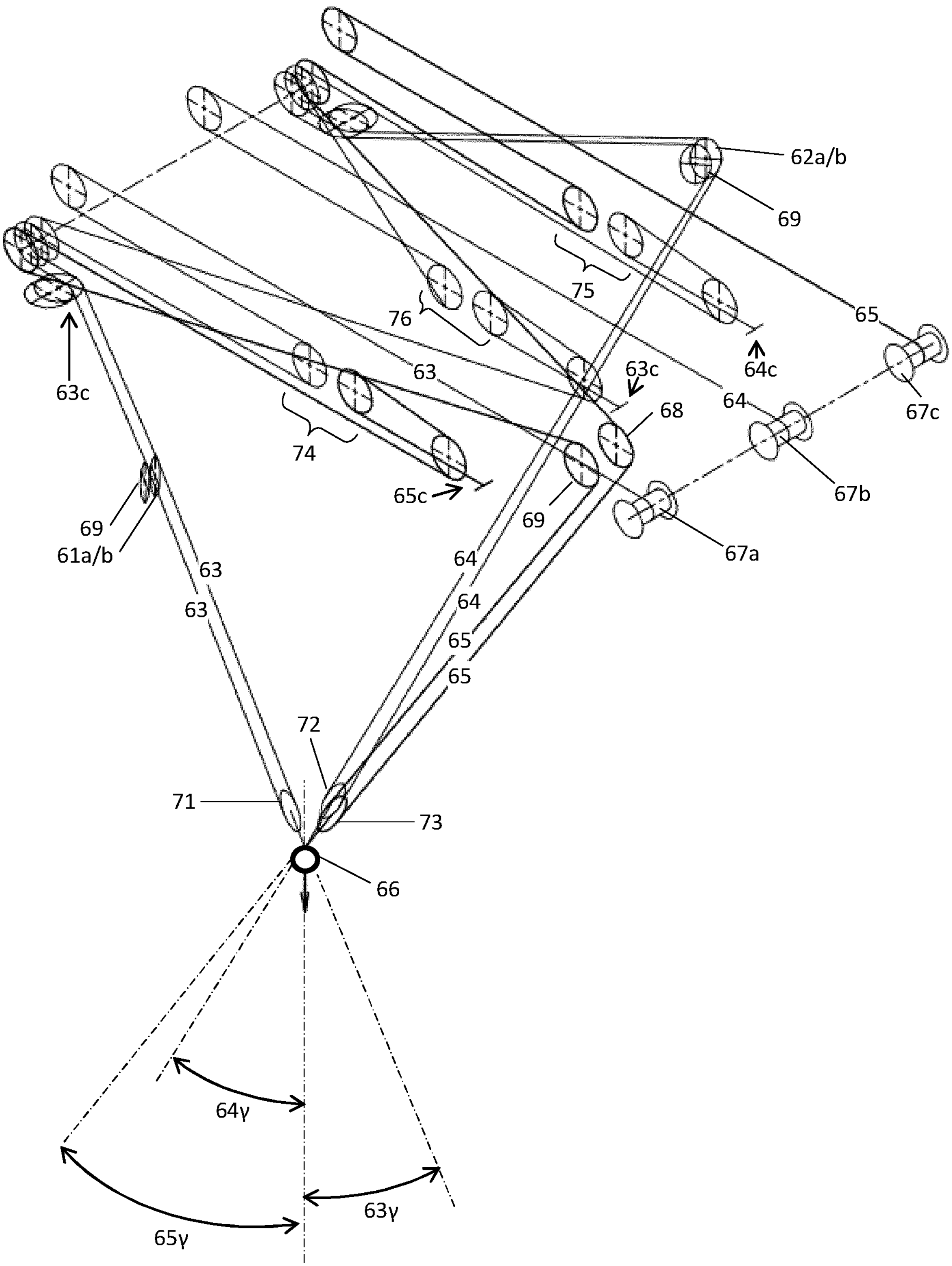

Such a threefold actuated mechanism 7 is illustrated in FIGS. 6*e-g* in the same fashion as in FIGS. 6*a-d*. The rest of the components of the crane 1 may for instance be the same as in the first and second embodiment of the crane 1.

When compared to the twofold actuated mechanism 7, the threefold actuated mechanism comprises in addition a third sheave pair 76 and an associated third adjustment actuator, e.g. a cylinder 79.

The third adjustment actuator 79 is configured for moving the third sheave pair 76 in the direction of the cables 63, 64 run there through in opposite directions.

The first cable 63 is reeved from the first winch 67*a* via:

the primary sheave of the first sheave pair 74,
the first departure sheave 61*a,*
the first return sheave 71,
a first guide sheave 69 on the first jib branch 56,
the secondary sheave of the third sheave pair 76 back to a dead end 63*c* of the cable secured to the crane, e.g. to the jib or the main boom.

The second cable 64 is reeved from the second winch 67*b* via:

the primary sheave of the third sheave pair 76,
the second departure sheave 62*a,*
the second return sheave 72,
a second guide sheave 69 on the second jib branch 57,
the secondary sheave of the second sheave pair 75, back to a dead end 64*c* of the cable secured to the crane, e.g. to the jib or the main boom.

The third cable 65 is reeved from the third winch 67*c* via:

the primary sheave of the second sheave pair 75,
the third departure sheave 68,
the third return sheave 73,
the third guide sheave 69 proximate the third departure sheave 68,
the secondary sheave of the first sheave pair 74, to a dead end 65*c* of the cable secured to the crane, e.g. to the main boom 4.

FIG. 6*f*, similar to FIG. 6*b*, illustrates the three respective curved trajectories 66.1, 66.2, 66.3 over each which the object suspension device 66 is moved in the horizontal plane in case just one of the three sheave pairs 74, 75, 76 is moved by the respective adjustment actuator 77, 78, 79.

By purposely combining operation of the three actuators, e.g. shortening and/or lengthening of the cylinders 77, 78, 79, components of the three movement trajectories 66.1, 66.2 are combined such as to move the object suspension device 66 along other trajectories in the horizontal plane. In particular, contracting and extending just two of the cylinders 77, 78, 79 by the same amount moves the object suspension device 66 over a straight trajectory.

Extending the first cylinder 77 and contracting the second cylinder 78 by the same amount results in the object suspension device 66 moving upwards in FIG. 6*f*, e.g. in a forward direction of the crane 1, along the central longitudinal jib axis 5*g*.

Straight horizontal movements to a lateral side of the crane can, for example, be obtained by combining components of trajectories 66.1 and 66.3.

Figure 7A:
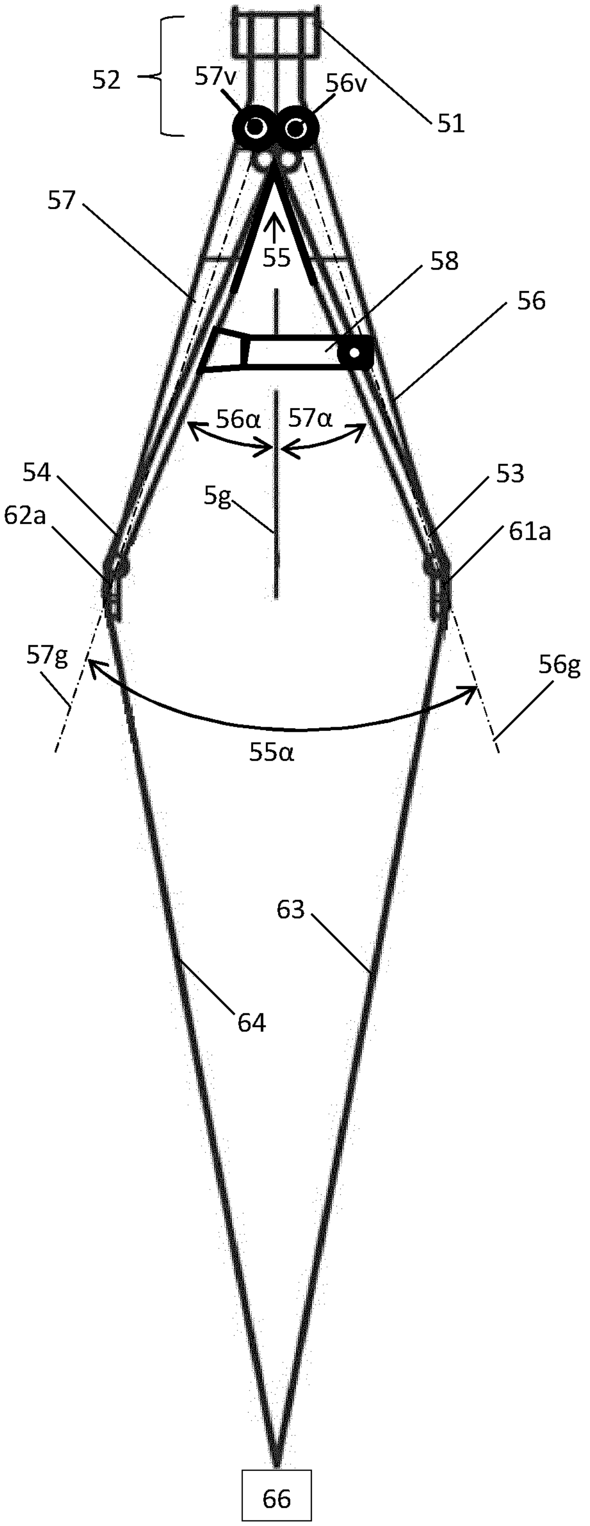
FIGS. 7*a-b* schematically show in a side and top view a jib of a third embodiment of the crane according to the invention, FIG. 7*c* schematically shows in a perspective view the suspension of the object suspension device from the hoisting cables of the third embodiment, FIGS. 8*a,b* schematically show in a side and top view the jib of a fourth embodiment of the crane according to the invention.
Figure 7B:
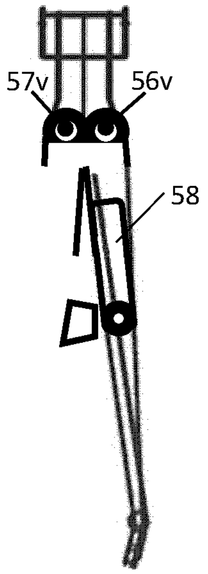
Figure 7C:
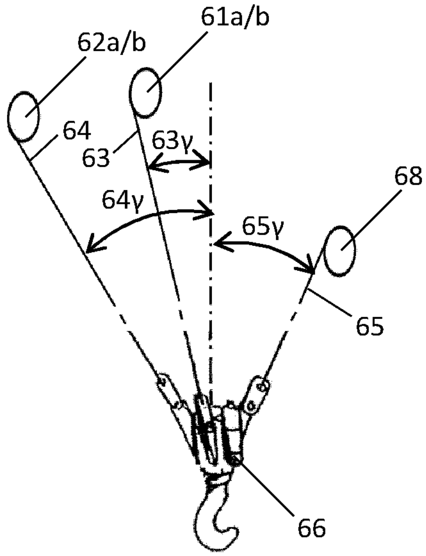

A third embodiment of a crane 1 according to the invention is shown in FIGS. 7*a*-*c*. In this embodiment the forked jib 5 is a collapsible forked jib 5.

The third embodiment differs from the first and second embodiment in that the jib branches 56, 57 are each driven by a respective first and second jib branch actuator 56*c*, 57*c* so as to be independently pivotal relative to the jib base 52 about the respective pivot axis. For example, each branch actuator comprises or is embodied as a linear drive actuator, e.g. a hydraulic cylinder, or comprises or is embodied as a motor with rotary output effecting the controlled pivoting of the one associated jib branch. For example, the motor with rotary output is a hydraulic or electric motor. For example, a transmission, e.g. a gear, belt, or chain transmission is connected to the motor with rotary output to effect the pivoting.

The jib branches 56, 57 are pivotal to provide for a collapsed configuration and multiple spread configurations of the forked jib.

In spread configurations the angle 55α between the first and second jib branches is larger than 20°. In the spread configuration shown in FIG. 7*a* the angle 55α of divergence between the first jib branch 56 and the second jib branch 57 is around 40°.

In the collapsed configuration the angle between branches 56, 57 is small, e.g. as small as possible, e.g. the branches being collapsed into contact with one another.

In the collapsed configuration the branches 56, 57 extend substantially parallel to each other, see FIG. 7*b*.

By operating the jib branch actuators 56*c*, 57*c*, the jib branches 56, 57 are independently pivotal. In embodiments, the jib branches 56, 57 are pivoted asymmetrically or symmetrically relative to the central longitudinal axis 5*g*.

In embodiment, the independent jib branch actuators 56*c*, 57*c* are operable to cause a lateral movement of the object suspension device 66 and the connected object 102 relative to the forked jib 5. For example, the actuators are operable to drive a pivoting of both the first and second jib branch 56, 57 in the direction of one lateral side of the central longitudinal axis 5*g* of the jib 5, such as to laterally displace the object suspension device 66 and therewith the object 102 connected thereto.

In embodiment, the independent jib branch actuators 56*c*, 57*c* are operable to manipulate the vertical angles 63γ, 64γ of the first and second hoisting cables 63, 64 and therewith the vertical angle 65γ of the third cable 65, e.g. in view of control of the stability of the object suspension device 66 and the connected object 102, as explained herein. For example, the independent jib branch actuators are operable to drive the pivoting such as to decrease the angle 55α between the first and second jib branch 56, 57 during a hoisting of an object 102, and to increase the angle 55α during a lowering of the object.

FIGS. 7*a*-*c* also illustrate an alternative locking mechanism for the spread position of the jib branches. In this embodiment, the collapsible forked jib 5 comprises a transverse bar 58, which is pivotally mounted to the first jib branch 56 and is releasably connectable to the second jib branch 57. In FIG. 7*a*, the transverse bar 58 is connected to the second jib branch 57 maintaining the first and second jib branch 56, 57 in the spread configuration thereof. In the collapsed configuration shown in FIG. 7*b*, the transverse bar 58 is pivoted into a position longitudinally aligned with the first jib branch 56.

FIG. 7*c* shows schematically the inverted pyramidal configuration of the hoist cables 63, 64, 65 for this second embodiment, which results from the spatial location of the departure sheaves 61*a*, 62*a*, and 68. It is visible that the object suspension device 66 here is suspended from the cables 63, 64, 65 in a single-fall arrangement.

FIGS. 8*a*, *b* illustrate the jib of a crane of a fourth embodiment of the invention, in which contrary to the first, second, and third embodiments the forked jib 5 is a rigid forked jib.

In the rigid forked jib 5 the first and second jib branches 56, 57 are fixed relative to the jib base 52, and form a rigid unit with the jib base 52. Consequently, the angle 55α between the first and second jib branch and the jib branch angles 56α, 57α is fixed.

The rigid forked jib 5 comprises the jib base 52 and at a bifurcation 55 remote from the inner end of the jib base the first jib branch 56 and the second jib branch are fixed to the base 52. The branches 56, 57 diverge from one another. The first jib branch 56 extends to the first jib tip 53 and a second jib branch 57 extends to the second jib tip 54, so that the second jib tip 54 is arranged spaced from the first jib tip 53 in a lateral direction with respect to the central longitudinal axis 5*g* of the rigid forked jib 5.

For example, the angle 55α between the first jib branch 56 and the second jib branch 57 is 40°. The longitudinal axes 56*g*, 57*g* of the first and second jib branch 56, 57 depart from the bifurcation 55 at equal jib branch angles 56α, 57α of around 20° with respect to the central longitudinal axis 5*g* of the jib.

It is illustrated that the departure sheaves 61*a*, 62*a* are each pivotal about an axis that is parallel to the longitudinal axis 56*g*, 57*g* of the respective jib branch.

Figure 9:
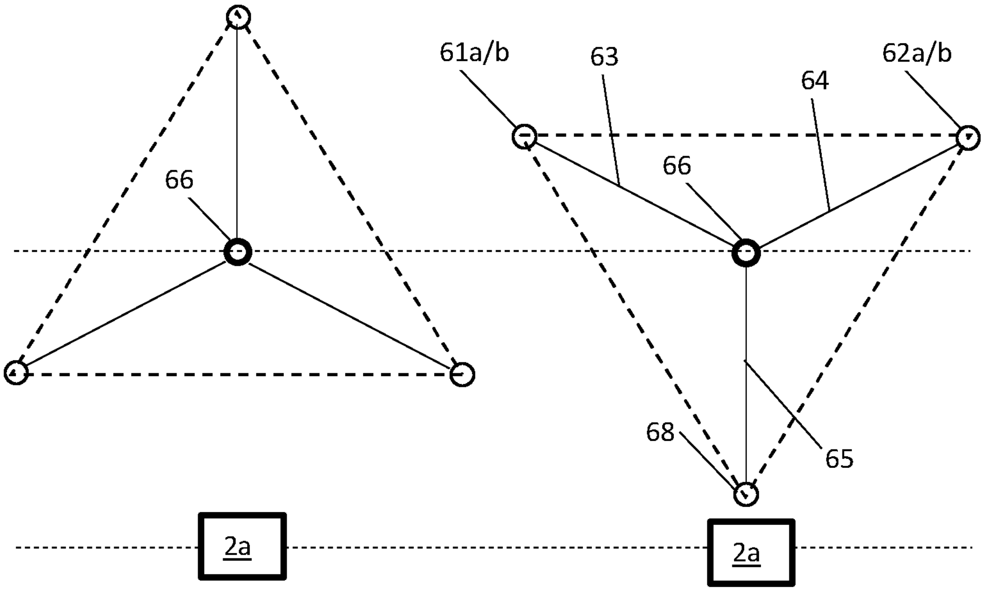
FIG. 9 shows a schematic comparison of spatial arrangements of departure sheaves in an inverted pyramid configuration of the three cables.

The FIG. 9 serves to illustrate an advantage of the inventive crane with spreader type jib.

The FIG. 9 shows schematically, in a top view, two spatial configurations of three cables from which the object suspension device 66 is suspended in an inverted pyramidal configuration, with the triangular base of the pyramid defined by the three departure sheaves.

In FIG. 9 the crane housing 2*b* is also identified, all other components are left out for clarity. The right-hand illustration shows the crane with jib according to the invention, wherein the third departure sheave 68 is closest to the crane housing 2*b* and wherein the departure sheaves 61*a*, 62*a* on the jib are further away.

The left-hand illustrations shows, for sake of comparison, the object suspension device 66 equally far from the crane housing 2*b*. However, in this arrangement two of the departure sheaves 80, 81 are closest to the crane housing, each laterally from a central vertical plane of the crane boom assembly, and one departure sheave 83 is furthest away from the crane housing. With the triangular base being equal to the right-hand illustration, it can readily be recognized that the sheave 83 is further away from the crane housing 2*b* in direction of the main boom than with the inventive jib. This illustrates that the inventive spreader type jib knuckle boom crane requires relatively little space for its operation, e.g. avoiding conflict between the crane and accommodation, e.g. at the bow of a supply vessel, adjacent a deck from which an object is to be picked up (normally aft on a supply vessel). Also it can be appreciated that this is beneficial in terms of control and stability, and/or in terms of stresses in the crane resulting from the handling of the object.

The FIG. 9 also illustrates that the crane 1 is advantageous for mounting at the side of an offshore vessel or structure, e.g. at the side of the hull or deck box structure of an offshore vessel, e.g. of a drilling vessel, e.g. as shown in FIGS. 5*a-c*, e.g. the crane 1 serving the transfer of objects between a supply vessel and the vessel.

The features of the different shown embodiments may readily be combined. For instance, the hoisting system 6 and the adjustment mechanism 7 of the third embodiment may readily be applied to the first, second and fourth embodiment, or with other embodiments with other types of forked jibs, knuckle boom assemblies or the other crane parts. Also, the embodiments of the jib may be interchanged between different embodiments of knuckle boom assemblies or the other crane parts.

Figure 10:
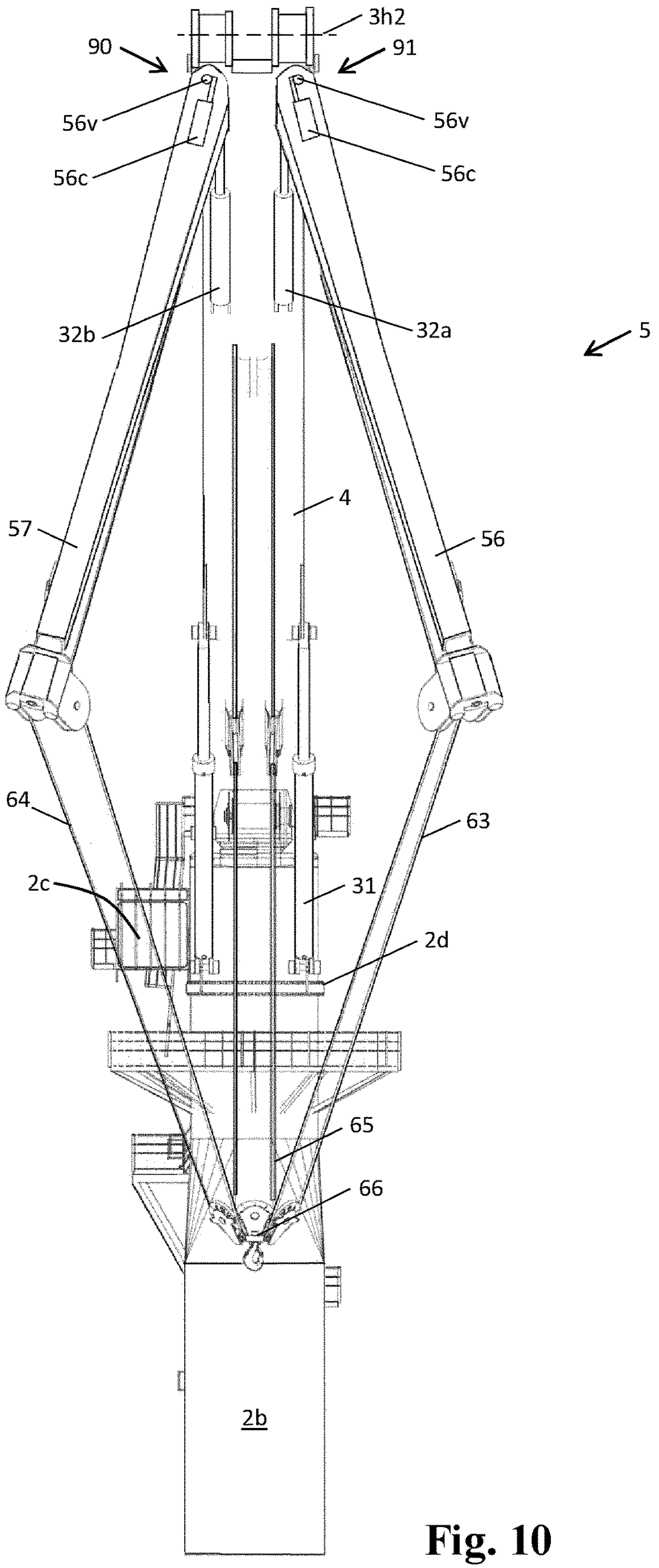
FIG. 10 shows a fifth embodiment of the crane according to the invention.

FIG. 10 shows a fifth embodiment of the crane according to the invention. Herein components corresponding to earlier described cranes have been denoted with the same reference numeral.

As in the crane of FIG. 1, the jib 5 is a collapsible forked jib 5. However, instead of the jib branches 56, 57 being mounted to a common jib base, so as to be pivotal with respect to said base, in this fifth embodiment the jib branches 56, 57 are independently mounted to the main boom 4, here the outer end thereof.

It is shown that each branch 56, 57 at a base end thereof, so an end adjacent the main boom 4, connected via a respective pivot structure 90, 91 to the main boom 4, so as to be both movable between the folded position and extended positions of the knuckle boom assembly, as well as between the spread configuration and the collapsed configuration of the collapsible forked jib 5.

It is shown that for folding and extending each branch 56, 57 there is an associated actuator, here cylinders 32*a, b*, that allow for independent control of the pivoting of the branch 56, 57 about a horizontal pivot axis 3*h*2 relative to the main boom 4.

For pivoting each branch 56, 57 between collapsed and spread configurations about respective axis 56*v*, 57*v* (perpendicular to axis 3*h*2) there are independently operable first and second jib pivoting actuators 56*c*, 57*c*, For example, each actuator 56*f*, 57*f* is a cylinder, or a motor, as explained herein.

The depicted jib 5 of FIG. 10, for example, allows for extending just one jib branch, e.g. when handling a small or light object.

The depicted jib of FIG. 10, for example, allows to bring the jib branches 56, 57 in different extended positions, e.g. when handling an object with constraints for the spatial location of the jib branches.

The depicted jib also allows, for example, to pivot both jib branches in the same direction, e.g. both to the left in the FIG. 10, e.g. allowing to shift the object suspension device 66 horizontally relative to a central vertical plane of the knuckle boom assembly.

The depicted jib also allows, for example, to vary the lateral distance between the first and second departure sheaves 61*a*, 62*a* by suitable pivoting of the jib branches 56, 57.

Figure 11:
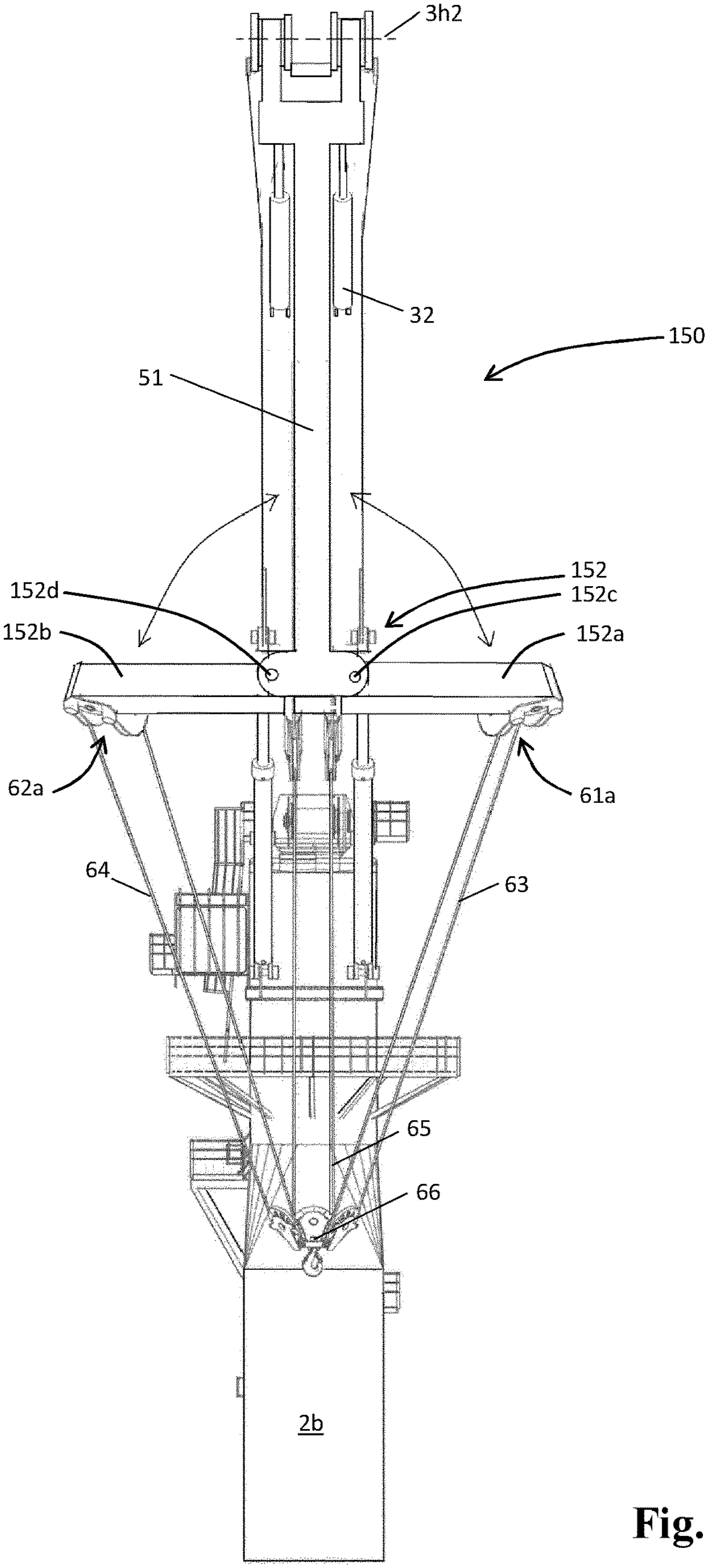
FIG. 11 shows a sixth embodiment of the crane according to the invention.

FIG. 11 shows a sixth embodiment of the crane according to the invention. Herein components corresponding to earlier described cranes have been denoted with the same reference numeral.

In FIG. 11 the collapsible jib 5 has a collapsible T-shaped spreader structure 150. The central member 151 of the spreader structure is pivotally mounted to the main boom 4, about horizontal axis 3*h*2, and extends along the longitudinal axis of the jib. Herein the first and second departure sheaves 61*a* and 62*a* are mounted on the cross member 152 of the T-shaped spreader structure, e.g. at opposed ends thereof.

As shown the cross member 152 is embodied so as to be collapsible in order to reduce the lateral extension of the jib 5 when desired, e.g. for storage of the boom assembly. The depicted cross-member is embodied as two swivelling cross-member elements 152*a,b*, each swivelling relative to the central member about a swivel axis 152*c, d* between an operative position transverse to the central member (see FIG. 11) and a collapsed position aligned with the central member, e.g. along a lateral side of the central member.

In conjunction with a collapsible T-shaped spreader structure, the first and second cables may be reeved over guide sheaves 85, 86 at the outer end of the main boom 4, and then pass to the departure sheaves 61*a*, 62*a*. For example, the cables 63, 64 first pass to further guide sheaves on the central member 151 and then diagonally to the respective first and second departure sheaves 61*a*, 62*a*.

The invention claimed is:

1. A marine knuckle boom crane comprising:
a pedestal;
a crane housing which is rotational relative to the pedestal about a vertical rotation axis;
a knuckle boom assembly attached to the crane housing, the knuckle boom assembly comprising:
a main boom having an inner end connected pivotally about a first horizontal pivot axis to the crane housing, an outer end, a topside, a bottom side, and opposed lateral sides; and
a jib connected via a pivot structure pivotally to the main boom, the jib having a central longitudinal axis;
a main boom luffing mechanism configured to pivot the main boom up and down relative to the crane housing;
a jib pivoting mechanism configured to pivot the jib relative to the main boom, between a folded position of the knuckle boom assembly, in which the jib is folded back relative to the main boom, and extended positions of the knuckle boom assembly; and
a hoisting system, comprising at least one departure sheave mounted on the jib,
wherein the jib is a spreader structure jib having a load bearing spreader structure of which a base end connects to the pivot structure, which spreader structure supports remote from said base end a first departure sheave and a second departure sheave of the hoisting system, said first and second departure sheave being laterally spaced from one another at opposed lateral sides of the central longitudinal axis,
wherein the hoisting system further comprises:
a third departure sheave mounted to the main boom and/or to the crane housing;
one or more winches;
a first cable driven by one of said one or more winches;
a second cable driven by one of said one or more winches;
a third cable driven by one of said one or more winches; and
an object suspension device configured to be connected to an object to be handled by the crane,
wherein the first, the second, and the third cable are each connected to the object suspension device and respectively pass via the first, second, and third departure sheave, to the respective winch of said one or more winches, wherein the first, the second, and the third cable together define an inverted pyramid which diverges upwards from the object suspension device when handling the object.

2. The crane according to claim 1, wherein the position of the third departure sheave is closer to the inner end of the main boom than the position of any of the first and second departure sheaves when the knuckle boom assembly is in the folded position thereof.

3. The crane according to claim 1, wherein the spreader structure of the jib is rigid.

4. The crane according to claim 3, wherein the jib is a rigid forked jib, the spreader structure having a jib base connected to the pivot structure and comprising a first and a second jib branch diverging laterally outward from the jib base with a fixed angle between the diverging first and second jib branches.

5. The crane according to claim 1, wherein the spreader structure of the jib is collapsible between a collapsed configuration and a spread configuration, wherein a lateral extension of the spreader structure is smaller in the collapsed configuration than in the spread configuration.

6. The crane according to claim 5, wherein the jib is a collapsible forked jib, the spreader structure comprising a first and second jib branch that are each pivotally mounted, such that the first and second jib branch are pivotal around respective jib branch pivot axes between the spread configuration of the forked jib in which the jib branches are diverging laterally outward and the collapsed configuration in which the jib branches are closer to the central longitudinal axis.

7. The crane according to claim 6, wherein the collapsible forked jib comprises a jib base that is connected pivotally about a second horizontal pivot axis to the main boom, wherein the first and second jib branch are each pivotally mounted, to the jib base for pivoting between the spread and collapsed configuration.

8. The crane according to claim 6, wherein the first and second jib branch are each at a base end thereof connected via a respective pivot structure to the main boom, so as to be both movable between the folded positions and extended positions of the knuckle boom assembly, as well as between the spread configuration and the collapsed configuration of the collapsible forked jib.

9. The crane according to claim 6, wherein the first and second jib branch are each pivotal between the collapsed position, and one or more spread positions in which the angle between the diverging first jib branch and second jib branch is between 20° and 80°.

10. The crane according to claim 6, wherein the first and second jib branch are each independently pivotal into multiple spread configurations of the jib, allowing for respective jib branch angles relative to the central longitudinal axis of the forked jib to differ from one another.

11. The crane according to claim 6, wherein the first and second jib branch are symmetrically pivotal into one or more spread configurations of the forked jib, so that the respective jib branch angles relative to the central longitudinal axis of the forked jib are equal to one another.

12. The crane according to claim 6, comprising one or more jib branch actuators configured to drive a pivoting of the first and/or of the second jib branch which varies the angle of divergence between them.

13. The crane according to claim 6, comprising one or more jib branch actuators configured to drive a pivoting of the first and/or of the second jib branch which varies the angle of divergence between them, wherein the spreader structure is movable into multiple spread configurations to allow for setting of different lateral spacing distances between the first and second departure sheave, the spreader structure comprising one or more actuators to move the spreader structure between the collapsed configuration and the spread configuration, wherein the one or more actuators are configured to vary the lateral spacing between the first and second departure sheave during a hoisting and/or lowering of the object suspension device, wherein the one or more jib branch actuators are configured to drive a pivoting of the jib branches during a hoisting and/or lowering of the object suspension device.

14. The crane according to claim 6, wherein the collapsible forked jib comprises a jib branch actuator, configured to extend and contract such as to move a mobile section thereof along the central longitudinal axis, wherein the collapsible forked jib comprises a first and second transverse bar each being pivotally connected to the mobile section with one longitudinal end thereof, and with another longitudinal end thereof to the first and second jib branch, respectively, such that extension and contraction of the jib branch actuator pivots each of the jib branches about the respective jib branch pivot axis via the transverse bars and moves the jib branches between the collapsed configuration and at least one spread configuration.

15. The crane according to claim 5, wherein the spreader structure is movable into multiple spread configurations to allow for setting of different lateral spacing distances between the first and second departure sheave, the spreader structure comprising one or more actuators to move the spreader structure between the collapsed configuration and the spread configuration, wherein the one or more actuators are configured to vary the lateral spacing between the first and second departure sheave during a hoisting and/or lowering of the object suspension device.

16. The crane according to claim 1, wherein the one or more winches are mounted on the crane housing, and wherein the first and second cable extend, seen in top view, above the topside of the main boom to a respective cable guide sheave for the first cable and a respective cable guide sheave for the second cable, said cable guide sheaves being mounted on the main boom in proximity to the pivot structure that pivotally connects the jib to the main boom, and wherein the spreader structure is provided with a guide sheave for the first cable and a guide sheave for the second cable that are mounted at the base end of the spreader structure.

17. The crane according to claim 1, wherein the object suspension device is suspended via each of the first, second, and third cable in a multi-fall arrangement, the hoisting system further comprising for the first, second and third hoisting cables a respective first, second, and third return sheave connected to the object suspension device over which the first, second and third hoisting cables are run, respectively.

18. The crane according to claim 17, further comprising a twofold actuated active suspension adjustment mechanism which comprises:

a first sheave pair and a second sheave pair, each of the sheave pairs comprising a primary sheave and a secondary sheave which are interconnected such as to enable two of the first, second, and third cables to run over the sheaves of the sheave pair in opposite directions;

a first adjustment actuator and a second adjustment actuator, each configured for moving respectively the first and second sheave pair in the direction of the two cables running over the sheaves of the respective sheave pair, wherein the first cable is reeved from the respective winch via:

the primary sheave of the first sheave pair;

the first departure sheave; and, the first return sheave, to a location on the crane where a dead end of the first cable is fixed, wherein the second cable is reeved from the respective winch via:

the primary sheave of the second sheave pair;

the second departure; and the second return sheave, to a location on the crane where a dead end of the second cable is fixed, wherein the third cable is reeved from the respective winch via:

the secondary sheave of the second sheave pair;

the third departure sheave;

the third return sheave;

a third guide sheave paired with the third departure sheave on the main boom and/or on the crane housing; and the secondary sheave of the first sheave pair, to a location on the main boom or the crane housing where a dead end of the third cable is fixed, wherein the first adjustment actuator is configured to move the first sheave pair such as to selectively increase or decrease the part of the length of the first cable between the respective winch and the first departure sheave and simultaneously respectively decrease or increase the part of the length of the third cable between the third guide sheave and the dead end of the third cable, wherein the second adjustment actuator is configured to move the second sheave pair such as to selectively increase or decrease the part of the length of the second cable between the respective winch and the second departure sheave and simultaneously respectively decrease or increase the part of the length of the third cable between the respective winch and the third departure sheave.

19. A method for hoisting an object, comprising using the crane according to claim 18, wherein the two-fold actuated active suspension adjustment mechanism is operated to provide a primarily horizontal controlled motion of the object suspension device, and wherein the one or more winches are operated, to provide primarily vertical motion of the object suspension device.

20. The crane according to claim 1, wherein the hoisting system further comprises a fourth departure sheave and a fifth departure sheave, wherein the fourth departure sheave is mounted to the spreader structure in the plane of the first departure sheave with the first cable running in between the first and fourth departure sheave, such that in the folded position of the knuckle boom assembly the first cable runs over the fourth departure sheave, and in extended positions of the knuckle boom assembly the first cable runs over the first departure sheave, and wherein the fifth departure sheave is mounted to the spreader structure in the plane of the second departure sheave with the second cable running in between the second and fifth departure sheave, such that in the folded position of the knuckle boom assembly the second cable runs over the fifth departure sheave, and in extended positions of the jib the second cable runs over the second departure sheave.

21. A marine vessel or offshore structure provided with the crane according to claim 1.

22. A method for hoisting an object, comprising using the crane according to claim 1.

* * * * *